United States Patent [19]

Renn et al.

[11] Patent Number: 5,688,775
[45] Date of Patent: Nov. 18, 1997

[54] β-1,3-GLUCAN POLYSACCHARIDES, COMPOSITIONS, AND THEIR PREPARATION AND USES

[75] Inventors: Donald W. Renn, Glen Cove; Lisa E. Dumont, Rockport; William C. Snow; Foner P. Curtis, both of Rockland, all of Me.

[73] Assignee: FMC Corporation, Philadelphia, Pa.

[21] Appl. No.: 185,642

[22] Filed: Jan. 24, 1994

Related U.S. Application Data

[63] Continuation-in-part of Ser. No. 776,106, Oct. 15, 1991, abandoned.

[51] Int. Cl.$^6$ .................. A61K 31/715; C07H 1/00; C08B 37/00
[52] U.S. Cl. .............. 514/54; 536/123.1; 536/123.12; 536/124
[58] Field of Search ................. 536/1.1, 123.1, 536/123.12, 124; 514/54

[56] References Cited

U.S. PATENT DOCUMENTS

| | | | |
|---|---|---|---|
| 3,893,996 | 7/1975 | Hamuro et al. | 536/123.12 |
| 4,774,093 | 9/1988 | Provonchee et al. | 536/123.12 |
| 4,946,450 | 8/1990 | Erwin | 424/428 |
| 5,084,386 | 1/1992 | Tusé et al. | 435/101 |
| 5,185,327 | 2/1993 | Matsuzaki et al. | 536/124 |

FOREIGN PATENT DOCUMENTS 2351520  4/1974  Germany.

OTHER PUBLICATIONS

Chemical Abstracts vol. 80, No. 23, Issued 10 Jun. 1974, Hamuro et al "Neoplasm–Inhibiting Modified Glucans", see p. 512,Column 2, Abstract No. 133763z Ger. Offen. 2,339, 953 28 Feb. 1974, Japan Appl. 72 78,992, 07 Aug. 1972.

Chemical Abstracts, vol. 93, No. 25, Issued 22 Dec. 1980, Deslandes et al "Triple-Helical Structure of (1→3)–β–D–Glucan" see p. 895, Column 1, Abstract No. 239803w, Macromolecules 1980, 13(16), 1466–71 (Eng).

Chemical Abstracts, vol. 114, No. 21, Issued 27 May 1991, Haze et al "Preparation of a Heat–Gelable beta–1',3–Glucan" see p. 673, Column 1, Abstract No. 205556e, Eur. Pat. Appl. EP 409,488, 23 Jan. 1991, JP Appl. 89/184,311, 17 Jul. 1989.

*Primary Examiner*—John Kight
*Assistant Examiner*—Everett White
*Attorney, Agent, or Firm*—Polly E. Ramstad; Richard E. Elden

[57] ABSTRACT

Irradiated or nonirradiated substantially pure β-1,3-glucan polysaccharides, derivatives and coprocessed mixtures thereof with other hydrocolloids, methods for their preparation, and uses for the aqueous gels prepared from them, including their use in the electrophoresis of DNA, RNA, and their fragments.

34 Claims, No Drawings

β-1,3-GLUCAN POLYSACCHARIDES, COMPOSITIONS, AND THEIR PREPARATION AND USES

This is a continuation-in-part of U.S. application Ser. No. 776,106 filed Oct. 15, 1991 now abandoned.

BACKGROUND OF THE INVENTION

1. Field of the Invention

This invention relates to β-1,3-glucan polysaccharides, compositions containing them, methods for their preparation, and their uses.

2. Statement of Related Art

A number of patents and technical articles have been published on β-1,3-glucan polysaccharides.

For example, the article "Properties of Gels Formed by Heat Treatment of Curdlan, a Bacterial β-1,3-Glucan" Maeda et al , *Agr. Biol Chem.*, Vol 31, No. 10, 1184–1188, 1967, investigated the nature of its gel formation when heated in aqueous suspension, including a finding that the presence of borate increased gel strength, while the addition of other salts did not, and a study of the effect of pH on gel strength. It was also found that the addition of urea caused a decrease in the gel-forming temperature.

U.S. Pat. No. 4,774,093 discloses the preparation of β-1,3-glucan polysaccharide gels by dissolving a β-1,3-glucan polysaccharide in an aqueous alkaline medium at a temperature of 55° C. or less, and while maintaining the resulting solution at a temperature of at least 50° C., but not more than 60° C., adjusting the pH to 10.0 or lower. The resulting gel has a coherent, uniform, non-particulate structure with a substantially uniform pH. The gel is used for supporting, separating, transforming or treating biological materials, as release coatings or carriers for pharmaceuticals, as edible gels, for use in toothpaste, as a gel coating for biological materials, and as a disposable contact lens.

U.S. Pat. No. 4,012,333 discloses a method for the production of gels from a β-1,3-glucan-type polysaccharide by exposing a basic solution of the polysaccharide to an atmosphere of a gaseous acid anhydride, such as carbon dioxide and the oxides of nitrogen and sulfur.

U.S. Pat. No. 4,950,749 relates to a process for the recovery of a nonionic water soluble glucan by the addition of a divalent cation to a solution of solubilized glucan, followed by the adjustment of the solution to an alkaline pH to precipitate the glucan. The water soluble glucans include scleroglucans and schizophyllans.

European published patent application No. 0 367 391 discloses the production of linear curdlan gels by heating aqueous suspensions of curdlan at a temperature of ≧85° C. through small diameter tubes. The gels are useful as food materials. Blends of curdlan with seaweed extracts and the like are also disclosed.

U.S. Pat. No. 5,002,669 discloses the use of 1,3-glucan and derivatives thereof to separate racemic mixtures, for the separation of geometrical isomers, and for the separation of polymers having different molecular weight ranges.

U.S. Pat. No. 4,973,581 relates to glucan derivatives having a side chain branch of a galactopyranose, an L-arabinofuranose, and derivatives and oligomers thereof. These glucan derivatives exhibit high tumoricidal activity.

In the article "Synthesis and Structural Analysis of Curdlan Sulfate with a Potent Inhibitory Effect in Vitro of AIDS Virus Infection", Yoshida et al., *Macromolecules*, Vol. 23, No. 16, 3717–3722, 1990, curdlan sulfate was prepared and tested against HIV viruses in vitro.

SUMMARY OF THE INVENTION

β-1,3-glucan polysaccharides are exo-3-glucan polymers containing almost exclusively β-1,3-glucosidic linkages. Except for agarose, these polysaccharides are the only presently known polysaccharides that have a neutral pH and form relatively firm hydrogels at low concentration. β-1,3-glucan polysaccharides are widely distributed in nature, present in the cell walls of yeast, in land and sea plants, and in the cell walls of seeds. They can also be produced by microbial fermentation. Microorganisms which produce the β-1,3-glucans include bacteria of the genera Alcaligenes, Agrobacterium and Streptococcus of which the species *Alcaligenes faecalis, Agrobacterium radiobacter, Agrobacterium rhizogenes* and *Streptococcus mutans*, including variants and mutations thereof, are the most widely known. One of the bacterially produced β-1,3-glucan polysaccharides is also known as curdlan, and is preferred for use in the practice of the present invention.

The gel forming β-1,3-glucan polysaccharides (such as curdlan) are soluble in aqueous bases but are insoluble in water and aqueous acids.

The β-1,3-glucan polysaccharides were initially used in food applications, but due to concentrations of natural impurities, were useless for biotechnical and biomedical applications. Unpurified fermentation β-1,3-glucans for example, contain significant quantities of cellular debris, nucleic acids, proteins, acidic polysaccharides and the like.

While advances in technology have resulted in convenient and economical methods for preparing gels such as the Critical Temperature Neutralization method of U.S. Pat. No. 4,774,093, which enabled the resulting gels to be used in a wide variety of applications, including biotechnical applications, no one has previously obtained a substantially pure β-1,3-glucan polysaccharide that results in gel-forming sols which are clear, gels which exhibit essentially no background fluorescence when stained with ethidium bromide, and which exhibit essentially baseline UV absorption at 260 nm. Accordingly, prior art β-1,3-glucan polysaccharide gels have not been uniformly useful for DNA electrophoresis, which requires the use of gels having the above properties.

Embodiment I of the invention is a substantially pure β-1,3-glucan polysaccharide, substantially pure β-1,3-glucan polysaccharide composition, aqueous gels containing such a composition, and uses for the aqueous gels in biotechnical and other applications, including use in DNA electrophoresis.

Embodiment II of the invention is a process for the preparation of water soluble salts of substantially pure β-1,3-glucan polysaccharides, the water soluble salts so obtained, and their uses.

Embodiment III of the invention is the use of chaotropic agents in the formation of β-1,3-glucan polysaccharide gels, the gels obtained following the removal of the chaotropic agents, the gels in which the chaotropic agents are not removed, and uses for all of the above gels.

Embodiment IV of the invention is a process for the preparation of derivatives of substantially pure β-1,3-glucan polysaccharides, the water soluble reversible gels that are obtained with these derivatives, and their uses.

Embodiment V of the invention is for coprocessed hydrocolloid compositions containing substantially pure β-1,3-glucan polysaccharides, and to uses for these compositions. Embodiment VI of the invention is for substantially pure β-1,3-glucan polysaccharides that have been irradiated, to gels formed from them, and to uses for the gels.

For example, a coprocessed hydrocolloid composition may be produced initially containing a) from about 10 to 90 parts by weight of at least one of: a substantially pure β-1,3-glucan, a substantially pure hydroxyalkylated β-1,3-glucan, a partially depolymerized substantially pure β-1,3-glucan, or a hydroxyalkylated derivative thereof, and b) the remainder of 100 parts by weight, of at least one hydrocolloid other than any of the above, desirably about 50 to 90 parts by weight of component a) are present (preferably substantially pure curdlan) and the component b) may desirably be agarose, an agarose derivative, clarified locust bean gum, sodium alginate, or starch.

DETAILED DESCRIPTION OF THE INVENTION

Other than in the operating examples, or where otherwise indicated, all numbers expressing quantities of ingredients or reaction conditions used herein are to be understood as modified in all instances by the term "about."

A process of the invention for the preparation of substantially pure β-1,3-glucan polysaccharides (hereinafter referred to as "β-1,3-glucans"), and which is especially useful for the preparation of substantially pure curdlan, is carried out using the following steps:

1. Crude β-1,3-glucan, for example, curdlan sold by Takeda Chemical Industries, Inc. of Japan, is washed with an aqueous alkali metal carbonate, for example, potassium or sodium carbonate, with sodium carbonate preferred. The aqueous solution preferably contains from 0.1 to 10% by weight alkali metal carbonate, with 1% by weight preferred. The pH of the aqueous alkali metal carbonate solution is maintained in the range of 7.0 to 9.5, preferably 8.5. The above pH range can be readily maintained by use of a buffer, with an $Na_2CO_3/NaHCO_3$ buffer preferred. The washing step is carried out for a period of from 0.5 to 10 hours, usually 1 hour. The washed crude β-1,3-glucan is then filtered and advantageously washed with additional aqueous alkali metal carbonate, followed by soaking in distilled or deionized water, for example, for 1 hour, and filtered.

2. The filtered β-1,3-glucan is then optionally but preferably washed with additional distilled or deionized water, and then added to sufficient aqueous alkali metal hydroxide, for example, NaOH or KOH, preferably sodium hydroxide, to dissolved the β-1,3-glucan. The concentration of the alkali metal hydroxide is not critical, and is generally from 0.01N to 1.0N, with 0.1N being preferred.

3. The resulting solution is filtered, preferably with use of a filter aid, and optionally under pressure.

4. The filtered solution is then heated to a temperature in the range of 50° to 60° C., preferably 55° C.

5. The solution is neutralized to a pH of from 3 to 10, preferably pH 7, with an organic or inorganic acid, preferably acetic acid, although other acids such as hydrochloric, phosphoric, sulfuric, and citric acids can also be employed.

6. The neutralized solution is coagulated by the addition of an excess quantity of a water-miscible organic solvent, for example, a $C_1-C_3$ alcohol, or acetone or methyl ethyl ketone, with isopropyl alcohol preferred.

7. The coagulate is separated from the liquid component, for example, by filtration or centrifugation. The coagulate can then be further washed, for example, with aqueous organic solvent, distilled water, and then organic solvent, followed by drying and comminution if desired.

The resulting β-1,3-glucan is substantially pure. Aqueous sols and subsequent gels can be prepared therefrom containing from 0.5 to 4% by weight β-1,3-glucan (0.5% to 10% by weight for derivatized β-1,3-glucan). These sols have the following properties:

a) essentially no background fluorescence when stained with ethidium bromide, b) UV absorption is essentially baseline at 260 nm, and c) the sol is clear, with none of the cloudiness characteristic of sols made from crude or partially purified β-1,3-glucans. Substantially pure β-1,3-glucan is soluble in dimethyl sulfoxide.

The aqueous gels are conveniently prepared by the process of U.S. Pat. No. 4,774,093, which is expressly incorporated herein by reference. In summary, the gels can be readily prepared by the following steps:

i) suspending the substantially pure β-1,3-glucan in distilled or deionized water, ii) dissolving the β-1,3-glucan by the addition of an alkali metal hydroxide for example, NaOH or KOH, at a temperature of 55° C. or below, iii) while maintaining the solution at a temperature of at least 50° C. but below 60° C., adjusting the pH of the solution using for example, acetic acid to 10.0 or lower, preferably 7.0 to 9.0, and iv) cooling the temperature of the solution below 40° C. to form the gel. The resulting gel is thermally reversible. Thermally irreversible gels can be prepared by either heating the solution above 50° C., for example, 70°–90° C., or forming a gel as above and then heating to 70°–90° C.

The substantially pure water soluble salts of the β-1,3-glucan polysaccharides of the invention are prepared by the following process steps:

1–3. The first three steps are identical to steps 1–3 set forth above relating to the preparation of substantially pure β-1,3-glucans.

4. The aqueous alkali metal hydroxide solution from step 3 which contains the water soluble alkali metal salt of the β-1,3-glucan is coagulated by the addition of an excess quantity of a water-miscible organic solvent, for example, a $C_1-C_3$ alcohol, or acetone or methyl ethyl ketone, with isopropyl alcohol preferred.

5. The coagulate is then separated from the liquid component, for example, by filtration or centrifugation. The coagulate is then advantageously washed with additional organic solvent, followed by drying and comminution if desired, to give a substantially pure water soluble alkali metal salt of the β-1,3-glucan.

Alternatively, the alkali metal salts can be prepared from the substantially pure β-1,3-glucans by dissolving the glucan in an aqueous alkali metal hydroxide solution, and then coagulating and isolating using steps 4 and 5 above.

It was further discovered that the alkali metal cation content in the above alkali metal salts of the β-1,3-glucan tends to increase with increasing concentration of the aqueous alkali metal hydroxide solution used in step 2, and hence the alkali metal cation content in the salt can be readily controlled within limits to produce the value desired. At a concentration of 0.1N for the alkali metal hydroxide solution, the alkali metal cation content in the resulting β-1,3-glucan salt is generally about 5%.

The substantially pure alkali metal salts of the β-1,3-glucan, for example, the sodium salt of curdlan, have an impurity content no greater than 1% by weight.

In addition to the above alkali metal salts of β-1,3-glucans, substantially pure gel-forming derivatives of β-1,3-glucans have been prepared. These derivatives are hydroxyalkylated β-1,3-glucans in which the hydroxyalkyl groups are monohydroxyalkyl groups containing from 2 to 4 carbon atoms or dihydroxyalkyl groups containing from 3 to 4 carbon atoms. Such derivatives can be prepared by the method similar to that disclosed in U.S. Pat. No. 3,956,273 to Guiseley (except that as β-1,3-glucan is employed in place of agarose). The preferred derivatives are $C_2$-$C_3$ hydroxyalkylated curdlan, especially hydroxyethyl curdlan, and glyceryl curdlan. The derivatives of the β-1,3-glucans have a degree of substitution (D.S.) of from 0.01 to 1.0, that is, from 1 to 33.3% of the hydroxy groups in the β-1,3-glucan have been substituted. It was discovered that the above hydroxy-containing derivatives of β-1,3-glucans, for example, hydroxyethyl curdlan and glyceryl curdlan, having the above degree of substitution are generally hot water soluble, thermoreversible gel-forming compounds. Depending on the degree of substitution some may be only soluble when the hot water also contains a base or a chaotrope, such as urea.

Gel formation of the above derivatives of β-1,3-glucans can be carried out in the same manner as described above for the substantially pure β-1,3-glucans.

The glyceryl derivatives of the β-1,3-glucans can also be prepared by the method disclosed in Example 1 of U.S. Pat. No. 4,275,196 to Shainoff, incorporated herein by reference, that is, by the reaction of the β-1,3-glucan with glycidol, using however smaller quantities of glycidol than those used in the Shainoff patent in order to keep the D.S. in the range of 0.01 to 1.0. Alternatively, the glyceryl derivatives can be prepared by reacting the β-1,3-glucan with 1-chloro-2,3-dihydroxypropane by the method disclosed in U.S. Pat. No. 3,956,273 referred to previously.

The above substantially pure β-1,3-glucans can be washed with either aqueous sodium carbonate solution, preferably a 1% solution at pH 8.5; aqueous urea, preferably a 1% solution; or an aqueous solution containing 1% sodium carbonate and 1% urea at pH 8.5, to remove any background fluorescence that might still be present in the material.

The β-1,3-glucans and their derivatives can optionally be irradiated by the use of gamma irradiation until the desired degree of depolymerization is obtained. Increasing degrees of depolymerization result in proportional decreases in gel strength and viscosity. Hence, the use of irradiation permits tailoring of gel strength and viscosity. Gamma irradiation is conveniently achieved by exposure to Cobalt 60 at a dosage in the range of 200 Krad to 800 Krad.

The alloy compositions of the invention comprise a mixture of a) from 10 to 90 parts by weight, preferably from 50 to 90 parts by weight of either a substantially pure β-1,3-glucan, a substantially pure hydroxyalkylated β-1,3-glucan, a partially depolymerized substantially pure β-1,3-glucan or hydroxyalkylated derivative thereof, or a mixture of two or more of the foregoing in any proportions, and b) from 90 to 10 parts by weight, preferably from 50 to 10 parts by weight, of another hydrocolloid. The other hydrocolloid can be agarose or a derivative thereof such as those disclosed in U.S. Pat. No. 3,956,273, clarified locust bean gum, sodium alginate, starch, and the like. The resulting alloy compositions produce aqueous gels having modified properties, for example, an alloy of equal parts of substantially pure curdlan and clarified locust bean gum forms an aqueous gel which is neutral and completely thermoreversible, even when heated. The aqueous gels contain from 0.5 to 10% by weight, preferably from 1 to 4% by weight, of the above alloy compositions.

The formation of aqueous gels of the substantially pure irradiated or nonirradiated β-1,3-glucans and their hydroxyalkylated derivatives and alloys (referred to hereinafter individually and collectively as "β-1,3-glucan compound") can also be carried out in the presence of chaotropic agents. Chaotropic agents are compounds known to break hydrogen bonds, such as urea, lithium iodide, lithium bromide, and guanidinium isothiocyanate. Aqueous gel formation is carried out as follows:

The β-1,3-glucan compound is suspended in an aqueous solution of at least one chaotropic agent, and if required the suspension is heated (for example, to a temperature in the range of from 20° to 100° C.) with stirring until the β-1,3-glucan compound is dissolved, and the resulting solution is cooled to form an aqueous thermoreversible gel. The aqueous solution of chaotropic agent contains from 20 to 80% by weight, preferably from 40 to 55% by weight of the chaotropic agent in water. Generally from 0.5 to 10% by weight, preferably from 1 to 4% by weight, based on the weight of the aqueous solution, of the β-1,3-glucan compound is suspended in this solution.

The chaotropic agents can be left in the aqueous gels or removed by repeated washing of the gels with water. These aqueous gels, with or without the chaotropic agents in them, exhibit increased gel strength, and with the chaotrope removed, a more open-pored structure compared to gels containing the β-1,3-glucan compounds prepared in the absence of a chaotropic agent.

While the prior art contains disclosures of the use of chaotropic agents with hydrocolloids, no disclosure of the present gels is present in this prior art. For example, the present gels are formed with a substantially pure β-1,3-glucan compound; the gels are formed from solutions of the β-1,3-glucan compound in the aqueous solution of chaotropic agent; and gels from which the chaotropic agents have been removed have not been disclosed previously. The use of chaotropic agents in gel formation in U.S. Pat. No. 4,774,093 requires the solubilization of the β-1,3-glucan in sodium hydroxide solution before the addition of the chaotropic agent. This procedure both limits the concentration of the gel that can be prepared and produces a gel that contains large quantities of sodium chloride, which is not a desired gel component. The present gels are free of inorganic salts. The *Agr. Biol. Chem.* article (Vol.31, No. 10, p. 1184–1188, 1967) discloses the addition of urea to a suspension and not a solution of the β-1,3-glucan and hence the present homogeneous gels cannot result.

All of the gels disclosed herein can be used for electrophoresis, and especially for the electrophoresis of DNA, RNA, and nucleic acid fragments from the foregoing, since the gel-forming sols of the invention are clear, and the gels formed therefrom exhibit essentially no background fluorescence when stained with ethidium bromide.

The gels of the invention generally provide significantly faster migration of DNA and RNA during electrophoresis than agarose gels, using either regular or pulsed fields. For example, electrophoresis of pBR 322 Msp I and φX174 Hae III DNA digests in a 4% gel of substantially pure curdlan made by dissolution in an aqueous 8.5M urea solution, followed by water washing, resulted in excellent separation and resolution of the DNA fragments.

In addition, the gels of the invention can be used for all of the uses set forth in U.S. Pat. No. 4,774,093, which is incorporated herein by reference, that is, as an electrophoresis gel medium for serum, for use in denaturing solvent electrophoresis, for isoelectric focusing, as immuno precipitation gel media, as carriers for biologicals, as targeted release coatings or carrier media for pharmaceuticals, as edible gels, for use in toothpaste, as gel coating for biological materials, and as disposable contact lenses, in the same manner as is set forth in U.S. Pat. No. 4,774,093, columns 6–9.

The invention will be illustrated but not limited by the following examples.

EXAMPLES

Example 1

Preparation Of Substantially Pure Curdlan

A. Ten grams of crude curdlan (lot# RF08, Takeda Chemical Industries, Tokyo, Japan) was suspended in 625 ml of 1% (w/v) sodium carbonate (anhydrous granular, lot #108F-0065, Sigma Chemical Company, St. Louis, Mo.) adjusted to pH 8.5 with 1.0M HCl, and stirred for 60 minutes. The suspension was vacuum filtered through a polyester cloth to recover the curdlan. The collected cake was rinsed with an additional 325 ml of the washing solution and then scraped from the cloth, transferred to 625 ml of distilled water and stirred for 60 minutes. After stirring for 60 minutes, the curdlan suspension was again vacuum filtered through a polyester cloth. After rinsing with 350 ml additional water, the curdlan was suspended in 562 ml distilled water. To this, 62 ml of 1.0N NaOH was added to dissolve the curdlan, then 80 g Hyflo Super-Cel® filter aid (Manville Service Corporation, Lompoc, Calif.) was stirred in. This slurry was then poured into a 1 liter pressure filter bomb, containing a piece of #54 Whatman® filter paper (Whatman LabSales, Hillsboro, Oreg.) previously coated with 16 g filter aid. The beaker was rinsed with 75 ml 0.1N NaOH and poured into the filter bomb. 20 psi (about 1.4 kg/sq. cm.) was applied and the filtrate collected. When completed, the filtrate was poured back into the filter bomb and refiltered at 35 psi (about 2.5 kg/sq. cm.). This filtration was repeated two additional times using pressures of 45 and 50 psi (about 3.2 and 3.5 kg/sq. cm.). To rinse the filter aid cake, 150 ml 0.1N NaOH was poured into the bomb. This filtrate was mixed with the previously filtered curdlan solution. The temperature was raised to 50°–55° C. in a microwave oven. The solution was then adjusted to about pH 7, as indicated by a pH meter, with 5M acetic acid while maintaining this temperature range. The neutralized curdlan solution was then coagulated in 2 times its volume (1400 ml) of 99% isopropyl alcohol (Fisher Scientific, Medford, Mass.). The coagulum was recovered by centrifugation at 7500 rpm for 10 minutes. The supernatant liquid was poured off and the curdlan pellets transferred to and broken up in 2×volume (1400 ml) 60% isopropyl alcohol. After 30 minutes, the coagulum was recovered on a polyester cloth by vacuum filtration. Excess alcohol was removed by squeezing. The residue was washed in 2×volume distilled water (30 minutes), recovered as above, and then hardened in 2×volume 99% isopropyl alcohol. The coagulum was again filtered, squeezed to remove excess alcohol and then was dried overnight (16 hours) in a forced hot-air oven at 55° C. Once dried, the sample was weighed to determine yield. 5.69 g (56.9% yield) was recovered and then ground through a 40 mesh screen. A 1% solution prepared from the product obtained from this process exhibited very little background staining with ethidium bromide, whereas a 1% solution of the crude curdlan exhibited excessive staining. Additionally, the absorption between 320 and 220 nm was significantly lowered with the curdlan product from the above process.

B. The procedure set forth in A above was repeated, except that the filtrate from the filter bomb was not heated and neutralized. Instead, it was coagulated in 2×volume acidified 99% isopropyl alcohol (1400 ml isopropyl alcohol containing 23 ml 5M acetic acid or 12 ml 9.8M acetic acid). A 1% solution of curdlan purified in this manner provided a reduction in absorption between 320 and 220 nm comparable to curdlan obtained above in A. Also, gel plugs made of this material had an equivalent level of background ethidium bromide staining as the curdlan from above procedure A.

C. The procedure set forth above in A was repeated, except that the curdlan was filtered only once through the filter bomb. The curdlan product obtained was essentially identical to that obtained using above process A.

D. Procedure A above was repeated except that the curdlan solution was refiltered twice. The levels of ethidium bromide staining and UV absorption of this material closely matched those obtained from the curdlan product of procedure A.

E. Procedure A above was repeated except that the sodium carbonate solution was adjusted to pH 7.5. The resulting curdlan product was substantially identical to the product from procedure A.

F. Procedure A above was repeated except that the sodium carbonate solution was adjusted to pH 9.5. The resulting curdlan product was substantially identical to that obtained from procedure A.

G. Procedure A was repeated except that the curdlan was washed three times in sodium carbonate with each wash having a different pH (pH 7.5, 8.5 and 9.5 sequentially). The resulting curdlan product had a slightly lower UV absorption than curdlan washed only at pH 8.5. Background staining was comparable.

H. Procedure A was repeated except that 5M phosphoric acid replaced acetic acid as the acid used to neutralize the filtrate. UV absorption and background staining were substantially identical for the resulting product compared to the product from process A above. However, use of $H_3PO_4$ led to excessive salt formation in the purified product as indicated by an elevated ash content (10 to 13% average). Curdlan produced in this manner had a lower gel strength ($\cong 55$ g/cm$^2$) due to the lower actual gum content in the product.

I. The procedure in A above was repeated except that 5M acetic acid was used to adjust the pH of the sodium carbonate solution. There were no observed differences between the resulting curdlan and that produced in process A.

J. Procedure A above was repeated except that 9.8M acetic acid was used to adjust the pH of the sodium carbonate solution. The curdlan product was substantially identical to that from process A.

K. Procedure A was repeated except that Celatom® diatomite was used in place of Hyflo Super-Cel® as the filter aid. This particular grade of filter aid produced curdlan with an absorption spectrum and background staining somewhat higher than the curdlan product from procedure A.

L. Procedure A was repeated except that the crude curdlan was dissolved directly in the NaOH solution. The resulting curdlan product in gel form had a 25% reduction in the 260 nm absorption peak compared to the curdlan product of procedure A.

M. Procedure A was repeated in the pilot plant except that a) the sodium carbonate solution was adjusted to pH 8.5 with 5M acetic acid instead of HCl, b) following the two initial washes, in $Na_2CO_3$ and in water, the curdlan powder was recovered by pressure filtration through a fitted piece of filter pad (Cuno Zeta Plus® filter pads, MWM Company, North Quincy, Mass.) textured side up, in a 1 liter filter bomb, at 10 psi (about 0.7 kg/sq. cm.), c) the curdlan solution was pressure filtered only one time in a filter bomb though a layer of nylon filter cloth (Filtra-Spec®, Hamden, Conn.) supported by a Cuno® filter pad, and d) the 700 ml of filtrate which was not heated or neutralized, was coagulated in 1400 ml 99% isopropyl alcohol which had been previously acidified with 23 ml 5M acetic acid. The yield was 6.678 g or 66.8%, and test results of the curdlan product (UV absorption, background staining and gel strength) were all comparable to curdlan produced in procedure A.

Procedure M was repeated using 2885 g of crude curdlan. 2200 g (78% yield) of substantially pure curdlan was obtained.

N. It was found that when substantially pure curdlan prepared by procedure M above was made into a high concentration gel (from 1 to 4%), the background fluorescence when stained with ethidium bromide was somewhat greater than desired. Accordingly, when high concentration gels are desired, further purification of the substantially pure curdlan is preferably carried out, using one of the following procedures:

a) 10 g of curdlan prepared using procedure M was suspended in 625 ml of a 1% solution of urea. The urea wash was carried out overnight at room temperature. The curdlan was subsequently recovered by filtration through polyester cloth and then rinsed with an additional 350 ml of the urea solution. The powder was then transferred to and washed in 625 ml of water for 1 hour. The sample was recovered by filtration as in procedure M and rinsed with 325 ml additional water. The curdlan was then dissolved by suspending it in 562 ml water and adding 62 ml 1.0N NaOH. The solution was filtered one time. The filtrate was heated, neutralized, coagulated, washed, recovered and dried as described in procedure M. The dried curdlan (5.75 g) was ground through a 40 mesh (420 micron) screen. A 1% solution was prepared for UV analysis and later used to determine gel strength.

b) 10 g of curdlan prepared using procedure M was treated according to procedure A above, except that only one filtration was carried out. A yield of 5.90 g was obtained, which was also made into a 1% solution for UV analysis and gel strength.

c) The process of b) above was carried out except that the sodium carbonate solution also contained 1% urea. A yield of 6.11 g was obtained, and a 1% solution was prepared by UV analysis and gel strength.

The substantially pure curdlan further purified according to the above procedures produced a very low level of background fluorescence even at high gel concentrations when stained with ethidium bromide.

The UV analysis and gel strength results are set forth below in Table 1.

TABLE 1

| Curdlan | $A_{320}$ | $A_{260}$ | $A_{220}$ | Gel Strength |
| --- | --- | --- | --- | --- |
| Procedure M | .1204 | .3121 | .8057 | 104 (106)* |
| Procedure N a) | .1408 | .2748 | .9114 | 76 (122) |
| Procedure N b) | .2704 | .3352 | 1.2685 | 78 (104) |
| Procedure N c) | .1615 | .3094 | 1.0628 | 64 (100) |

*values in ( ) indicate gel strength for heat-set gels in g/cm$^2$, first value is for cold-set gels O. A number of other procedures were carried out wherein procedure A was repeated except that the following washes were used in place of sodium carbonate solution:
cold water
hot water
1% NaCl
0.01N acetic acid
0.001M NaOH The resulting curdlan product from each of the above procedures was unacceptable since the 260nm absorption peak was much too high.

P. Procedure A was carried out except that the crude curdlan was directly dissolved in the sodium hydroxide solution and aliquots were separately treated with activated charcoal, activated clays, or chitosan prior to the filtration step. While some reduction in the 260 nm absorption peak resulted from each treatment, none produced an acceptable product.

Comparative Example A

An attempt was made to purify "pyrogen-free" β-1,3-glucan which had been produced by the solvent "purification" method taught by U.S. Pat. No. 5,084,386 to Tuse et al. Crude β-1,3-glucan was hydrated in 50 ml of distilled water for 20 minutes. This suspension was then centrifuged for 10 minutes. The supernatant was poured off and measured (17.5 mL) thus giving an equivalent cell mass volume of 35 mL/5 g or 7 mL/g of crude glucan.

To 1100 mL of distilled water, 6 g of crude curdlan was added. The suspension was stirred at room temperature for a period of 35 minutes. The sample was then centrifuged at 4,000 rpm for 10 minutes. The solids were resuspended in 1100 mL of fresh distilled water and stirred an additional 15 minutes. The glucan was again centrifuged at 4000 rpm for 10 minutes. The solids were vacuum filtered through #54 Whatman filter paper to remove residual excess water. The glucan was transferred to a 250 mL round bottom flask to which 2×volumes (84 mL) of methanol was then added. The flask was attached to a condenser and 2 L of 90° C. hot water was added to the water bath beneath the flask. Once refluxing began, the process was continued for 10 minutes. The flask was removed, the contents transferred to a 400 mL beaker and allowed to cool. The flask was rinsed with 2×volumes (84 mL) chloroform which was then added to the methanol/glucan mixture. This was stirred for 30 minutes at room temperature. The solids were recovered by vacuum filtration on #54 Whatman filter paper and then resuspended briefly in 3×volumes (126 mL) fresh chloroform. The sample was again vacuum filtered and was resuspended in a mixture of 42 mL methanol and 84 mL chloroform. This was stirred for 60 minutes and recovered by vacuum filtration. The solvent-extracted solids were placed in a 1 L round bottom flask and a dilute suspension made by adding 500 mL of 1N HCl. A heating mantle was used to bring the sample to a low boil until no solvent odor was detected. The mixture was then refluxed for 2 hours, cooled on ice and vacuum filtered to recover the solids. The glucan was stirred in 1000 mL of distilled water for 10 minutes, recovered as above and resuspended in 1000 mL fresh water. To raise the pH, 10 drops of 1.0N NaOH were added before stirring for an additional 10 minutes. A third 10 minute wash was performed in 1000 mL of distilled water containing 15 drops 1.0N NaOH to stabilize the pH at ~6. The product was recovered by vacuum filtration and dried at 50° C. in a forced air over for 15 hours. The dried material (2.02 g or ~33% yield) was ground through a 40 mesh screen. This material was then compared to the original crude glucan material and material purified by a sodium carbonate wash as described in Example 1A hereof. To 22.5 mL of distilled water, 0.25 g of a glucan sample was added to separate beakers. To each, 2.5 mL of 1.0N NaOH was added to give a final concentration of 1% gum in 0.1N NaOH. These were stirred at room temperature. The crude material and the Example 1A material both readily dissolved at room temperature. The material obtained from the Tuse process showed no signs of solubility. An additional 2.5 mL of the 1.0N NaOH and 0.025 g glucan were added yet there was still no observable solubility. The sample was then heated to boiling in a microwave oven where the sample turned bright yellow. It was removed and stirred where the color darkened and eventually became brown. There was still no solubility. The crude glucan and Example 1 samples were similarly heated to boiling but neither displayed the same color generation. Solubility was then tested in dimethyl sulfoxide (DMSO) by suspending 0.25 g in 25 mL of the solvent. Again, both of the crude and Example 1 samples dissolved readily at room temperature within 5–10 minutes whereas after 20–30 minutes solids were still present in the Tuse preparation. This was then heated but insoluble material was still evident. All 3 samples were heated to ~70° C. and an equal volume of boiling water was stirred into each to test for gel forming ability. The crude and Example 1 samples formed firm coherent gels upon cooling. The Tuse sample formed an opaque slush and flowed readily.

From the above it is clear that the substantially pure pyrogen-free compound produced by the process of U.S. Pat. No. 5,084,386 to Tuse et al. is a severely degraded insoluble product which will not form an aqueous sol or gel, and hence is not a β-1,3-glucan according to U.S. Pat. No. 4,774,093 to Provonchee et al., but instead is a pyrogen-free degraded β-1,3-glucan.

Example 2

Properties, Evaluation Methods, and Results
  Gel Formation
  General—Using the critical temperature neutralization procedure, both cold-set and heat-set gels of the base soluble β-1,3-glucans were prepared. Specific examples of each are given below.

Cold-set - To prepare 100 ml volume of a 1% curdlan gel, 1.0 g of the substantially pure curdlan prepared by the process of Example 1A above, was slowly added to 90 ml of distilled water with stirring. After this was fully dispersed, 10 ml of 1M NaOH was added and stirring was continued until the curdlan was completely dissolved. This solution was heated briefly in a microwave oven to raise the temperature to 55° C. While maintaining the solution temperature at 50°–55° C., neutralization was effected using 2 ml of a 5M acetic acid. This solution was rapidly poured into a mold and allowed to gel.

Heat-set—To prepare 100 ml of a heat-set gel, the same procedure was followed to prepare the neutralized solution as for the cold-set gel. Two methods were used to prepare a heat-set curdlan gel: (1) The liquid was poured into a prewarmed mold keeping the temperature as close to 55° C. as possible, then heated in a hot water bath at 70°–80° C. for 30 minutes, and (2) The cold-set gel was formed, then heat treated.

UV Absorption Assay
  Determination of the ultraviolet (UV) absorption spectrum of a curdlan solution indicates the presence of contaminants such as DNA, protein and cellular debris. The efficiency of the purification process can be monitored, in part, by this assay. One percent solutions of curdlan were prepared using 0.1M NaOH. The test solutions were transferred to 10 mm UV cells (VWR Scientific). Both crude (lot#RF08, Takeda Chemical Industries, Inc., Tokyo) and substantially pure curdlan from procedure IA were assayed. A Beckman DU® 7 spectrophotometer was used to obtain the spectra. The following parameters were used: temperature, 20° C.; wavelength, 320 nm to 220 nm; scan mode (300 nm/minute). The background was blanked with distilled water and 0.1N NaOH was used as the control. The scan trace feature was used to obtain exact absorption values at selected wavelengths (320, 260 and 220 nm). The results of the foregoing are shown in the following table.

| Absorption Values Of The 1% Curdlan Solutions | | | |
|---|---|---|---|
| Sample | $A_{320}$ | $A_{260}$ | $A_{220}$ |
| Crude Curdlan | 0.2775 | 0.8192 | 2.2482 |
| Procedure IA Curdlan | 0.0725 | 0.1434 | 0.5967 |

As explained in the Comparative Example, it was impossible to dissolve the degraded product produced by the process of U.S. Patent No. 5,084,386 to Tuse.

Gel Plug Evaluation
  This procedure was devised to visually examine the relative amount of ethidium bromide background staining of a 1% curdlan gel. To prepare a 1% (w/v) curdlan solution, 0.25 g of the substantially pure curdlan was suspended in 22.5 ml distilled water. 2.5 ml of 1.0N NaOH was added to dissolve the curdlan (final NaOH concentration was 0.1N). The curdlan solution was heated to 55° C. on a hot plate and 0.5 ml 5M acetic acid was added with stirring. One milliliter of the neutralized curdlan solution was pipetted into a 10 ml Pyrex® beaker using a Rainin Pipetman® (P 1000) and allowed to gel by cooling. The gel plug was removed using a spatula, then placed in an ethidium bromide solution (1 microgram per milliliter concentration). The gel, after staining for 30 minutes, was destained in distilled water for the same amount of time. These gel plugs were then illuminated using an ultraviolet light (Fotodyne® model 3-4400). Photographs were taken at F4.5, ½ second with a Polaroid® MP-4 Land camera and type 57 4×5 Land film. Development time was 20 seconds. Visual comparisons were made. The crude curdlan had an unacceptably high background fluorescence, while the substantially pure curdlan exhibited essentially no background fluorescence.

Moisture And Ash Analyses
  Moisture and ash determinations were then carried out. Moisture was determined by the weight loss of the samples in a vacuum oven at 75° C. overnight. Ash was determined by heating the samples from the moisture determination at 750° C. in a platinum crucible until they became white and then determining the weight of the residues. The results of the foregoing are shown the following table.

| Sample | % Moisture | % Ash |
|---|---|---|
| Crude Curdlan | 7.40 | 3.05 |
| Substantially Pure Curdlan | 4.44 | 0.38 |

Example 3

Purification Process Applied To A β-1,3-glucan From Another Source

The purification procedure described in Example 1A was used, with the following minor modifications, to purify a β-1,3-glucan sample from the Weston Research Centre (Toronto, Canada). Only 4 g of the crude material was used, although the volumes of reagents ($Na_2CO_3$, water, and isopropyl alcohol) remained the same. In addition, centrifugation to recover the primary coagulum was not needed and recovery was by vacuum filtration through a polyester cloth. The amount recovered was 2.277 g or 56.9%.

Example 4

Purification Process Applied To Partially Depolymerized Curdlan

The purification processes applied to the partially depolymerized crude curdlan (lot #2T-27)(by 200 Krad and 600 Krad irradiation) was essentially the same as described in Example 1A except as below noted. Fifteen grams of 200 Krad irradiated crude curdlan was washed with the $Na_2CO_3$ and water using proportions and times as in Example 1A. The washed curdlan was transferred to 562 ml of distilled water and then 62 ml 1.0N NaOH was added. After stirring for several minutes, the resulting solution was further processed by filtration, neutralization of the filtrate at 55° C., then coagulation in 99% isopropyl alcohol (IPA). The coagulum was allowed to stand in 3×volume of 99% isopropyl alcohol overnight and was then collected by vacuum filtration through a tightly woven nylon cloth, using a large Buchner® funnel. Another 99% isopropyl alcohol wash (3×volume) was used to harden the coagulum. The dried product yield was 8.669 g, or 57.8%.

In a manner similar to Example 1A fifteen grams of more highly irradiated (600 Krad) crude curdlan was purified. Instead of heat neutralization, the curdlan was coagulated directly in acidified alcohol (10ml 5M acetic acid in 600 ml 99% IPA). The yield was 7.450 g, or 49.7%.

Example 5

Effect of Chaotropic Agents, With And Without Further Treatment Preparation of 1% curdlan gels containing 6M urea was as follows. A 12M urea solution was prepared by dissolving 108 g urea (lot #48F-0235 from Sigma Chemical, St. Louis, Mo.) in 50 ml of distilled water using heat and vigorous stirring. This urea solution was made up to 150 ml using distilled water, then mixed well. A 2% purified curdlan was prepared by adding 3 g of substantially pure curdlan prepared by the process of Example 1A to 120 ml distilled water. To dissolve the curdlan, 30 ml 1.0 N NaOH was added with stirring. The 150 ml of 12 M urea solution was added to the 150 ml of 2% purified curdlan solution. This solution was then stirred, while heating gently, for several minutes. Using a microwave oven, this solution was brought to a temperature of 55° C., then neutralized (pH 7.0) with 5M acetic acid, with continuous stirring. The neutralized solution was then poured into 2 small Pyrex® 3150, 50×70 cm glass crystallizing dishes (150 ml each). The solutions were allowed to gel at room temperature.

Gel strength was measured after chilling the gel at 4° C. for 2 hours. The gel was carefully inverted in the crystallizing dish. Using an FMC Marine Colloids™ Gel Tester model GT-2, (FMC Corp. Philadelphia, Pa.), in conjunction with a digital scale from AND® , model EW-3000A, the average of 4 plunges was recorded as the gel strength value.

When the chaotropic agent was directly used to prepare 1% purified curdlan solution, gels were formed by the following procedure. A 1% substantially pure curdlan containing 1M guanidine isothiocyanate gel was prepared by dissolving 88.65 g guanidine isothiocyanate (lot #109F-0050, Sigma Chemical, St. Louis, Mo.) in 500 ml distilled water. The volume was brought up to 675 ml with distilled water and stirred for several minutes. Substantially pure curdlan (7.5 g) was added with vigorous stirring. Then, 75 ml 1.0N NaOH was added with stirring, while heating briefly, to dissolve the curdlan completely. Using a microwave oven, this solution was heated to a temperature of 55° C., then neutralized with 5M acetic acid while stirring. The solution was immediately poured into 5 small crystallizing dishes, allowed to gel at room temperature, chilled, the gels inverted and gel strength determined. In a like manner gels were prepared using the following chaotropic agents, all from Sigma Chemical Co., St. Louis, Mo.: LiCl (lot #88F-0048), LiBr (lot #48F-3442), LiI (lot #78F-3517), potassium thiocyanate (lot #10F-0507), and guanidine hydrochloride (lot #40F-0040).

Washing Protocol To Remove Chaotropes From Gels

To remove urea from a 1% purified curdlan gel containing 6M urea, the gel was removed from the crystallizing dish and carefully placed in 2 liters of distilled water in a 4 liter capacity beaker. The gel was washed for 24 hours with gentle stirring. Following this extensive washing, the gel was placed in a small crystallizing dish and gel strength measured as above described. Purified curdlan 1% gels containing other chaotropic agents listed in Table 2 were also washed before and after heat setting. Gel strength data from these washed gels are listed in Table 2.

Heat-setting Procedure

A purified curdlan gel (1%) containing 6M urea, prepared as described above, was heat-set by placing the crystallizing dish containing the gel in a boiling water bath for 20–30 minutes. The water level of the bath was maintained at the same level as the gel. After the gel was heat set, it was allowed to cool and the gel strength measured as above described. Purified curdlan gels (1%) containing other chaotropic agents listed in Table 2 were heat set before and after removing the chaotropic agent by washing. Gel strength data from these heat set gels are listed in Table 2.

Recovery Of Washed Cold Set Gels

An extensively washed 1% purified curdlan gel, originally prepared using 0.25M LiI, was dissolved in 300 ml 0.1N NaOH to recover the curdlan for testing to see if the increased gel strength was inherent in the gel structure or some basic change to the curdlan had occurred. After the gel was completely dissolved in a base, the solution was heated in a microwave oven to 55° C., then neutralized with 5M acetic acid. This neutralized solution was coagulated in 2×volume 99% isopropyl alcohol (900 ml). The coagulum was centrifuged at 7500 rpm for 10 minutes, then washed for 30 minutes in 60% isopropyl alcohol, then distilled water, and finally in 99% isopropyl alcohol. Volumes in each wash were 900 ml. The coagulum was recovered between washes by vacuum filtration through a polyester cloth. Following the 99% isopropyl alcohol wash, the coagulated curdlan was dried at 55° C. overnight. The recovered curdlan, 0.319 g, was ground in a Thomas-Wiley mill through a 40 mesh (420 micron) sieve. A 1% gel was formed using the recovered curdlan, and gel strength measured. Results are recorded in Table 2. The same recovery procedure was used for other gels prepared using other chaotropic agents. The gel strength results are listed in Table 2.

TABLE 2

| Sample | Initial | Washed | Recovered Washed | Recovered Heat Set | Heat Set Washed | Washed Heat Set |
|---|---|---|---|---|---|---|
| 1% Curdlan(control) | 106 | 74 | 64 | 155 | 186 | 155 |
| 3M LiCl | 85 | 176 | 69 | 149 | 55 | 94 |
| 0.5M LiBr | 305 | 341 | — | 208 | 192 | 218 |
| 1.5M LiBr | 299 | 208 | 81 | 176 | 155 | 174 |
| 3M LiBr | 202 | 200 | 96 | 227 | 248 | 224 |
| 0.1M LiI | 244 | 247 | 83 | 152 | 158 | 235 |
| 0.25M LiI | 360 | 366 | 118 | 178 | 217 | 413 |
| 0.5M LiI | 454 | 406 | 85 | 216 | 216 | 254 |
| 1.5M LiI | 346 | 345 | — | 230 | 330 | 195 |
| 3M LiI | 210 | 233 | 64 | 420 | 421 | 269 |
| 3M KSCN | 358 | 361 | 100 | 331 | 375 | 310 |
| 3M Urea | 242 | 357 | — | 424 | 471 | 423 |
| 6M Urea | 218 | 523 | — | 168 | 394 | 812 |
| 9M Urea | 95 | 382 | 84 | 152 | 458 | 446 |
| 1M Guanidine HCl | 205 | 314 | — | 240 | 208 | 235 |
| 0.1M Guanidine HSCN | 244 | 276 | — | 194 | 247 | 198 |
| 0.25M Guanidine HSCN | 313 | 342 | — | 226 | 320 | 275 |
| 0.5M Guanidine HSCN | 186 | 359 | — | 359 | 310 | 315 |
| 1M Guanidine HSCN | 137 | 185 | — | 72 | 196 | 764 |
| 2M Guanidine HSCN | 47 | 144 | — | 582 | 118 | 401 |

*gel strength values (g/cm$^2$) on as is basis

Some of the above preparations would not form heat-set, thermoirreversible gels, but instead melted when heated, and then reset to gels when cooled, particularly those made up in 0.5M LiBr (heat-set/washed), 1M guanidinium chloride (washed/heat-set), 6M urea (heat-set), and 2M guanidine-HSCN (heat-set/washed). In addition, none of the gels formed in the presence of urea or lithium salts formed completely thermoirreversible gels. Melting was not complete when the cooled "heat-set" gels were reheated, but they regelled on cooling again.

Effect Of Chaotropic Agents On Crude Curdlan, With Or Without Further Treatment

1% crude curdlan gels containing chaotropic agents were prepared as described above, with or without washing, heat-setting, and recovery of washed cold set gels. The gel strength data of these 1% crude curdlan gels are listed in Table 3.

chamber (model#750, Aquebogue Machine Shop, Aquebogue, N.Y.). After the gel had solidified, the three middle lanes were removed by cutting. To fill this space a 1% (w/v) curdlan solution was prepared by suspending 0.25 g substantially pure curdlan (Example 1A) in 22.5 ml distilled water. The sample was dissolved by adding 2.5 ml 1.0N NaOH. The solution was heated to 55° C. on a hot plate and then neutralized with 0.5 ml 5M acetic acid. This solution was then poured into the agarose framing gel and allowed to cool and solidify. To equilibrate the gel with the running buffer, it was covered with the 0.5×TBE buffer. The buffer was changed twice and allowed to continue equilibrating overnight. Before loading the DNA samples, the buffer was changed again. The wells were then loaded with 5 microliters (200 ng) of a heat-treated sample of Hind III lambda DNA digest containing bromophenol blue as a tracking dye. Electrophoresis was performed at 60 volts (5 V/cm) for 82 minutes. After the dye had migrated 4.5 cm in

TABLE 3

Gel Strength of 1% Crude Curdlan (g/cm$^2$)

| Sample | Cold Set | Cold Set/ Washed | Recovered | Heat Set | Heat Set/ Washed | Washed/ Heat Set |
|---|---|---|---|---|---|---|
| 1% Crude | 102 | 103 | 91 | 120 | 110 | 133 |
| 0.5M LiI | 346 | 416 | 97 | 326 | 392 | 189 |
| 6M Urea | 173 | 491 | 17 | 229 | 522 | 267 |
| 1M Guanidine HSCN | 186 | 268 | 71 | 232 | 270 | 225 |

Example 6

Use Of Purified Curdlan As An Electrophoresis Medium—Cold Set Gel

To examine the properties of substantially pure curdlan gels as an electrophoretic medium, a cold-set gel was prepared in an agarose framing gel. First, a 1% (w/v) solution of SeaKem® LE agarose (FMC Corporation, Philadelphia, Pa.), was prepared by dissolving 0.25 g agarose in 25 ml 0.5×TBE buffer (49.5 mM Tris base, 49.5 mM boric acid, 1 mM EDTA [pH8.0]). This was used to cast a gel, 3 mm thick, in a mini submarine gel electrophoresis the agarose, the gel was removed and stained in an ethidium bromide solution (1 microgram/ml) for 35 minutes, followed by destaining in distilled water for the same amount of time. The gel was examined and photographed under a UV light source as described in Example 2 (Gel plug procedure). In contrast to similar gels prepared previously from crude curdlan, where the intense background fluorescence obscured the separated nucleic acid fragments, DNA bands were readily and easily visible. In addition, DNA migration was considerably faster in the curdlan than in the agarose framing gel. The results of the foregoing are shown in the following table.

| DNA FRAGMENT SIZE | DISTANCE MIGRATED (mm) | |
| --- | --- | --- |
| (kb) | 1% AGAROSE | 1% CURDLAN |
| 23.1 | 10.7 | 20.0 |
| 9.4 | 11.8 | 24.5 |
| 6.6 | 13.2 | 27.6 |
| 4.3 | 14.5 | 31.3 |
| 2.3 | 19.5 | 38.6 |
| 2.0 | 21.3 | 39.9 |
| 0.56 | 40.4 | 54.4 |

Crude vs Purified

A second 1% agarose gel was prepared as described above. In this example, two areas were cut out, each comprising 2 lanes. One of these cut-outs was filled with a neutralized solution of purified curdlan (1%), prepared as above. The other cut-out was filled with a neutralized 1% crude curdlan solution (lot#RF08). The entire gel was equilibrated in 0.5x TBE buffer as described above. Electrophoresis and detection were all performed as above except that the duration was slightly shorter (75 minutes). DNA bands were easily visible in both the agarose and purified curdlan gels but due to excessive background, there were no such bands visible in the lanes filled with crude curdlan.

Modifications

1. A second gel was prepared from substantially pure curdlan as above described. The only variation was that 0.5x Tris acetate EDTA buffer [20 mM Tris base, 20 mM acetate and 0.5 mM EDTA (pH 8.0)] was used in place of 0.5x TBE buffer. There were no significant differences in the banding or migration of the DNA fragments using this buffer system as compared to that run in 0.5x TBE.

2. Using conditions identical, except as indicated below, to those described above, a third electrophoretic separation of DNA was performed. In this example a 1.5% curdlan gel was used. Suitable migration and DNA banding was obtained although the results showed that DNA mobility in curdlan, at this concentration, was only slightly faster than in the 1% agarose gel.

3. Pulsed Field Gradient Electrophoresis 100 ml of a 1% SeaKem® LE agarose (lot#62677) solution in 0.5x TAE buffer (20 mM Tris base, 20 mM acetate, 1 mM EDTA [pH 8.0]) was prepared and used to cast a gel in a 13.2 cm rotating gel apparatus (custom built by the Aquebogue Machine Shop, Aquebogue, N.Y.). Three of the center lanes were cut out and filled with a 1% solution of purified curdlan which had been neutralized with 6N $H_3PO_4$. The entire gel was flooded with 0.5x TAE buffer to effect equilibration overnight (16 hours). After changing the buffer, the wells were loaded with slices of *Schizosaccharomyces pombe* gel plugs (FMC Corporation, Philadelphia, Pa.) and then sealed with a small volume of molten agarose. Electrophoresis was performed for 20 hours under the following conditions: pulse time was ramped from 25 minutes to 35 minutes; the angle was 105°; voltage was 1.15 V/cm at 15 amps; initial buffer temperature and pH were 15.5° C. and 8.3 respectively. Power was supplied by a LKB 2301 Macrodrive 1 (Pharmacia LKB Biotechnology AB, Piscataway, N.J.) and the custom program was executed by a Commodore® 64 computer. The gel was stained, destained and visualized as described above. Results demonstrated that such substantially pure curdlan gels are suitable for pulsed field electrophoresis. The three S. pombe chromosomes were distinctly visible, whereas the agarose had resolved only two of the three chromosomes under these conditions. Additionally, the chromosomes had migrated further in the curdlan than in the agarose framing gel.

Example 7

Use Of Substantially Pure Curdlan As An Electrophoresis Medium—Heat Set Gel

A 1% SeaKem® LE agarose (FMC Corporation, Philadelphia, Pa.) solution, prepared in 0.5x TBE buffer, was poured into a plastic mold from a ReadyCast™ gel (Ciba-Corning Diagnostics Corp., Palo Alto, Calif.) and allowed to gel. The 4 lanes in the center were cut out and removed. This space was then filled with a neutralized solution of 1% curdlan prepared as described in Example 1A. The curdlan was allowed to cool and gel. The exposed surface of the gel was covered with a thin plastic sheet whose edges were then taped and clamped. The entire unit was submerged in a 75° C. water bath for 30 minutes. The unit was removed from the bath and allowed to cool. After cooling, the gel was removed and placed in 0.5x TBE buffer to equilibrate overnight (16 hours), then placed in the mini chamber and flooded with fresh buffer. Wells were loaded with DNA samples as described in Example 6. Separation took place at 60 volts (5 V/cm) for 80 minutes. Staining, destaining and detection were carried out as in Example 6. Migration and separation of the DNA fragments were observed in the heat-set curdlan gel insert. However, the mobility of the DNA in this heat-set curdlan preparation was significantly slower than the cold-set curdlan gel, and equivalent to, if not slightly slower than, that which occurred in the agarose framing gel. Also, the bands observed in the curdlan were somewhat diffuse. There was no appreciable background staining observed in the curdlan. The background fluorescence level was barely discernible and was almost as low as that observed in the agarose gel.

Example 8

Use Of Purified Curdlan As An Electrophoresis Medium—Chaotrope Treated Gel Prelude: Gel Shrinkage It was observed that curdlan gels prepared in 6M urea shrank as the urea was removed by leaching or washing. To assess these changes a series of carefully prepared gels at 0.4, 0.6, 0.8, 1.0 and 1.2% (w/v) initial concentrations were weighed, washed and then reweighed. For example, a 1% solution was prepared by mixing 16 g distilled water, 0.25 g substantially pure curdlan (Example 1A), 1.78 ml 1.0N NaOH, 9.01 g urea and 356 microliters 5M acetic acid. When still liquid, 20.07 g of this was poured into a clean, tared beaker. After cooling, the gel was removed and found to weigh 19.60 g. The gel was washed in 2 liters distilled water overnight (16 hours) with gentle stirring. The water was changed and the process continued 2 additional hours. The gel was removed, gently blotted to remove excess water, and reweighed. The weight had dropped to 7.80 g, a decrease of 12.27 g. The amount of curdlan in the original gel was calculated to be 0.183 g (20.07/27.396 (actual weight of prepared solution))×0.25 g. Thus, the new concentration can be calculated by; 0.183/7.80=2.35%. The gel piece was then dried completely to verify the actual (anhydrous) gum content. This process was repeated for the other concentrations and the results tabulated in below Table 4.

TABLE 4

| Initial Concentration | Initial Gel Weight | Actual Curdlan Content | Final Weight | Final Concentration |
| --- | --- | --- | --- | --- |
| 0.4% | 20.033 | 0.074 | 7.788 | 0.95% |
| 0.6% | 20.012 | 0.110 | 8.115 | 1.36% |
| 0.8% | 20.060 | 0.147 | 8.000 | 1.84% |
| 1.0% | 20.070 | 0.183 | 7.800 | 2.35% |
| 1.2% | 20.060 | 0.219 | 8.180 | 2.68% |

Taking the slope of the graph, the following equation was obtained to calculate the final concentration of a curdlan gel prepared in 6M urea; $y=0.195+2.093x$, $R=0.993$.

Electrophoresis With Chaotrope-modified Gel

A curdlan gel (initial concentration of 0.4%, final concentration of 1.03%) was prepared for use as an electrophoretic medium. 0.1 g substantially pure curdlan was suspended in 16.1 ml distilled water. 1.78 ml 1.0N NaOH was added to dissolve the sample. 9.01 g urea (lot#48F-0235, Sigma Chemical Co., St. Louis, Mo.) was added and allowed to dissolve completely. The solution was heated to 55° C. on a hot plate and 356 microliters of 5M acetic acid was added to neutralize the solution. This was used to cast a gel 3 mm thick in a mini submarine electrophoresis chamber. After the gel had formed, it was removed and placed in 2 liters of distilled water to leach out the urea. This process continued over a weekend for about 60 hours. The water was replaced with 2 liters of fresh water and allowed to stand another 6 hours. This wash water was poured off and replaced with 0.5x TBE buffer and the gel was allowed to equilibrate overnight. The equilibrated gel was cut in half and one half was placed back into the mini chamber. A 1% Seakem® LE agarose solution in 0.5x TBE was prepared and cast in the mini chamber, adjacent to the curdlan gel. Once the agarose gelled, the chamber was flooded with fresh buffer. The gels were loaded with DNA as described in Example 6, current applied, and the samples were electrophoresed for 45 minutes at 60 volts (5 V/cm). Staining, destaining, detection and photographing were performed as previously described. The mobility and migration of the DNA fragments were greatly accelerated in the urea-modified curdlan. Resolution was good but the bands lacked the sharpness seen in the agarose. The results of the foregoing are shown in the following table.

| DNA FRAGMENT SIZE (kb) | DISTANCE MIGRATED (mm) | |
| --- | --- | --- |
| | AGAROSE | CURDLAN |
| 23.1 | 6.5 | 19.5 |
| 9.4 | 7.5 | 25.0 |
| 6.6 | 8.0 | 28.0 |
| 4.3 | 8.9 | 30.0 |
| 2.3 | 12.5 | 32.5 |
| 2.0 | 13.5 | 33.5 |
| 0.56 | 23.5 | 38.0 |

Modifications

1. A 0.75% (initial concentration, 1.77% final concentration) curdlan gel containing 6M urea was prepared as described above. Electrophoresis of Hind III lambda digest was performed in this gel after leaching of the chaotrope and equilibration in 0.5x TBE buffer. The run time was 80 minutes at 5 V/cm and proved to be excessive, since the smallest fragment ran off the mini gel. Migration speed was very rapid and the actual DNA bands were rather broad. However, this did not interfere with resolution of the individual bands.

2. A second gel prepared as described above (0.75%/1.77%) was electrophoresed for 25 minutes. Each of the 7 Hind III γ DNA digest bands was visible and resolved into tight bands. Separation of the individual bands was good with one exception. The 2.0 and 2.3 kilobase pair fragments, although discernible, were not well resolved.

3. A 1% purified curdlan/0.5M lithium iodide gel was prepared, washed, equilibrated and electrophoresed in the manner described above. The DNA fragments were separated and resolved into moderately narrow bands. Migration in the modified curdlan gel was slightly faster than in the 1% agarose framing gel.

Example 9

Soluble Salt Formation 30 g of substantially pure curdlan was dissolved in 1 liter of 0.1N NaOH. This material was heated to 55° C. in a microwave oven and coagulated directly in 2 liters of 99% isopropyl alcohol. Neutralization was omitted. The coagulum was recovered by vacuum filtration through a polyester cloth. Excess fluid was removed by squeezing. The coagulum was then washed in 2 liters of 80% isopropyl alcohol for 30 minutes. The coagulum was recovered and allowed to harden in 99% isopropyl alcohol. Following recovery, the coagulum was dried overnight at 55° C. in a forced hot air oven. 28.824 g of the dried material was recovered (96% yield). This was ground through a #60 mesh (250 micron) screen. One gram of this material was suspended in 100 ml distilled water. There was a little clumping observed, but upon heating it went into solution. Several drops of 1% phenolphthalein (in 50% ethanol) were added and the solution, which had been heated to 55° C., was titrated with 5M acetic acid. The endpoint, as indicated by the loss of color, was reached after the addition of 0.6 ml of the acid. This neutralized solution was poured into a 70×50 mm crystallizing dish and allowed to gel. The gel was refrigerated at 4° C. for 2 hours. The gel strength was assayed as previously described. An average value of 30.5 g/cm$^2$ was obtained which is somewhat lower than the substantially pure curdlan obtained after neutralization. This can be accounted for by the lower gum content.

Modifications

1. A 1% solution of substantially pure curdlan in NaOH was coagulated, without heating, in 2×volume (300 ml) 99% isopropyl alcohol. The product obtained from this procedure after washing and drying (as above) was also soluble in room temperature water. The gel strength of this material (at 1%) was found to be 39 g/cm$^2$.

2. Four 1% solutions of substantially pure curdlan were formed in the following concentrations of NaOH: 0.01N, 0.05N, 0.1N, and 0.5N. These four solutions of curdlan were heated to 55° C. and coagulated in 2×volume (800 ml) 99% isopropyl alcohol. The products obtained from this procedure after washing and drying (as above) were also soluble in room temperature water. The pH of the curdlan solutions before coagulation were recorded, as were the pH values of the 1% recovered curdlan salt solutions formed in water. Also recorded were the % moisture, % ash content, and % Na ion content. Cation content was found to be variable for the four curdlan salts (results shown below), although constant within a narrow range.

3. Four 1% solutions of purified curdlan were formed as above for the following concentrations of KOH: 0.01N, 0.05N, 0.1N, and 0.5N. The curdlan salts obtained were soluble in room temperature water. The pH values for the 1% solutions were recorded as well as in the % moisture, % ash content, % K ion content, and gel strength. The cation content of the four curdlan salt products were found to be variable, but with relative constancy in a narrow range. The results of the foregoing are shown in the following table.

Analysis of Curdlan Salt Products

| 1% Curdlan in Base | pH | % Moisture | % Ash | *% Na+ | *% K+ | pH in Water | Gel Strength |
|---|---|---|---|---|---|---|---|
| 0.01N NaOH | 11.3 | 11.0 | 3.8 | 0.92 | | 10.3 | 99 |
| 0.05N NaOH | 12.4 | 9.5 | 14.8 | 4.14 | | 11.1 | 92 |
| 0.1N NaOH | 13.2 | 9.8 | 10.8 | 4.15 | | 11.2 | 58 |
| 0.5N NaOH | 11.4 | 18.8 | 33.4 | 11.08 | | 11.8 | 48 |
| 0.01N KOH | 11.4 | 10.2 | 7.6 | | 1.97 | 10.6 | 86 |
| 0.05N KOH | 12.3 | 9.0 | 8.2 | | 5.46 | 11.0 | 74 |
| 0.1N KOH | 12.6 | 8.6 | 10.8 | | 6.41 | 10.5 | — |
| 0.5N KOH | 13.2 | 13.3 | 28.8 | | 19.49 | 12.2 | 13 |

*corrected for moisture

Example 10

Towle Procedure Gel And Evaluations

A 1% solution of substantially pure curdlan was prepared as described in Example 9. This non-neutralized sample was poured into a mini chamber to a depth of 3 mm. The entire chamber was placed in a large crystallizing dish (Kimax® #2300, 190×100 mm, VWR Scientific, San Francisco, Calif.). The gel was set according to the procedure disclosed in U.S. Pat. No. 4,012,333 - Towle which describes the process for making gels from a β-1,3-glucan by exposing a basic solution of the polysaccharides to an atmosphere of a gaseous acid anhydride. Two 100 ml beakers, each containing≅50 ml reagent grade glacial acetic acid (VWR Scientific, San Francisco, Calif.) were placed in the crystallizing dish which was then sealed with plastic wrap. This was allowed to stand at room temperature for 24 hours. The acetic acid was removed and the gel, which formed and was now saturated with the acid, was flooded with water. The water was changed several times during the next 36 hours. The gel was then flooded with 0.5x TBE buffer as in Example 6 and equilibrated over 18 hours with a number of buffer changes. Fresh buffer was added and Hind III γ DNA digest was prepared and loaded as described in Example 9, modification 1. Electrophoresis was performed for 70 minutes at 5 V/cm. Staining, destaining, detection and photographing was performed as set forth in Example 6. Migration and separation of the 7 fragments was observed as in the cold-set gels described in Example 6. However, the overall mobility of the DNA appeared slower.

Modification

A 1% substantially pure curdlan/6M urea solution was prepared as in Example 8. This solution was used to form a mini gel by the method described by Towle and disclosed above. Following gelation, washing and equilibration, a 1% SeaKem® LE agarose gel in 0.5x TBE buffer was cast in the mini chamber adjacent to the curdlan gel. The gels were loaded with DNA samples and electrophoresed as in the modified curdlan gel. The mobility of the DNA was equivalent to that seen in the agarose framing gel and smearing of the bands was observed in some of the curdlan lanes, possibly due to incomplete removal of the urea or acetic acid or insufficient equilibration with the buffer.

Example 11

Derivatives
Hydroxyethyl

Twenty-five grams of substantially pure curdlan was added to 405 g of distilled water at room temperature. 45 ml 1.0N NaOH was added to dissolve the sample. The solution was gently heated to 76° C. in a hot water bath. Five milliliters of a solution containing 4.4M NaBH$_4$ in 14M NaOH was added and stirred with an overhead mixer for 15 minutes. Fifty ml of a solution containing 17 g solid NaOH (lot#220189, J. T. Baker Inc., Phillipsburg, N.J.) was added, followed by a mixture containing 50 ml distilled water and 10 ml 2-chloroethanol (lot#B17B, Eastman Kodak Company, Rochester, N.Y.) which was slowly added during a 10 minute period. The solution temperature was raised to 84° C. and this temperature was maintained for 70 minutes without stirring. One hundred and thirty milliliters of room temperature distilled water was added, lowering the temperature to 74° C. Eight drops of antifoam (1-octanol) were added to reduce foaming. Neutralization of the reaction mixture was begun by slowing adding 3M acetic acid. After 120 ml of the required volume (170 ml) had been added, a large proportion of the solution gelled and was discarded. The remaining volume of alkaline material, approximately 300 ml, was coagulated directly in 2 liters of 99% isopropyl alcohol. The coagulum was recovered by vacuum filtration through a polyester cloth, squeezed to remove excess liquid and then washed in 1 liter 80% isopropyl alcohol for 30 minutes. The coagulum was recovered in a like manner and transferred to 1 liter 99% isopropyl alcohol for 20 minutes. After recovery, the sample was dried at 55° C. for several hours. The sample (5.18 grams) was recovered and ground through a 40 mesh (420 micron) screen. The dried sample was readily soluble in water, producing an alkaline solution having a pH of approximately 10. When this solution was heated to 55° C. and subsequently neutralized, a gel was formed upon cooling. This behavior paralleled that of the soluble salt of Example 9. To accurately determine the effect(s) of hydroxy-ethylation, 1.5 g was dissolved in 135 ml distilled water, heated to 55° C. and then neutralized with 5M acetic acid. The neutralized sample was coagulated in 300 ml 99% isopropyl alcohol. A fine precipitate formed and was recovered as pellets by centrifugation (8000 rpm, 10 minutes). The pellets were transferred to and broken up in 500 ml 99% isopropyl alcohol. The sample was recovered by centrifugation as above and dried at 55° C. Sixty-nine percent (1.04 g) of the material was recovered. One half gram of this sample was boiled in 45 ml distilled water where a major proportion dissolved. The solution, which had a neutral pH, formed a thermoreversible gel upon cooling to about 17° C. in an ice bath. This material differed from a non-derivatized curdlan in that its gel was not stable to a solution of 8.5M urea (it dissolved), would not form a gel in a solution containing urea, and did not form a heat-set, thermoirreversible gel upon heating. Additionally, the gel formed with the derivative was exceptionally clear whereas non-derivatized curdlan gels are usually somewhat opaque. There was also a marked decrease in viscosity observed in solutions of this curdlan derivative, as well as subsequent samples, when compared to non-derivatized curdlan. This allowed for the easy preparation of gels up to 8% in concentration whereas preparing a 4% gel with curdlan is rather difficult.

Modifications

1. Twenty-five grams of substantially pure curdlan was added to 470 g distilled water at 23° C. Four milliliters of 12M NaOH was added and the solution was heated slowly to 79° C. in a hot water bath. Ten drops antifoam were added followed by 12.5 ml 12M NaOH. Twenty milliliters of 2-chloroethanol was diluted in 50 ml distilled water and then added dropwise into the vortex of the reaction mixture over 25 minutes (≅3 ml/min.). Stirring and heating were continued for 60 minutes (final solution temperature was 84° C.). One hundred and twenty milliliters cold distilled water (8° C.) was added, lowering the solution temperature to 64° C.

The alkaline solution was coagulated in 1400 ml 99% isopropyl alcohol which had been acidified with 159 ml 3M acetic acid. The coagulum was recovered by vacuum filtration through polyester cloth, squeezed dry and then washed in 1400 ml 70% isopropyl alcohol for 30 minutes. The coagulum was recovered in a like manner and then dried at 55° C. for 18 hours. The product was recovered (23.45 g 93.8% yield) and ground through a 40 mesh screen. One half gram of this product was boiled in 50 ml distilled water where it dissolved fully. Solution pH was neutral. Upon cooling, a very elastic, thermoreversible gel formed. Analysis of the derivative (modified Zeisel method) gave a value of 5.33%, corresponding to a degree of substitution of about 0.2. Gelling temperature was 54.5° C. and melting temperature was determined to be 91° C. at 1.5% gum concentration.

2. Other levels of 2-chloroethanol use resulted similarly in water-soluble curdlan derivatives which differed in certain characteristics, primarily gelling temperature. The procedure used for additional experimentation was that described in the first modification above. For example, 15 ml 2-chloroethanol (in 50 ml water) was added to a mixture of 25 g of purified curdlan, 475 ml water, 4 ml 4.4M NaBH$_4$ in 14M NaOH and 33.75 ml 12M NaOH at a temperature of 80° C. and reacted for 60 minutes. Coagulation and recovery was identical to that described in modification 1 above. The dried material (23.76 g, 95% yield) was recovered and ground. This material was readily and fully soluble in boiling water and formed a reversible gel upon cooling. Gelling temperature was determined to be 67° C. and melting temperature was 83° C.

3. The above process which used 10 ml of the 2-chloroethanol, was repeated incorporating the changes described in modification 1 (that is, use of acidified alcohol). The material obtained in this second 10 ml derivatization was not fully soluble in boiling water. The sample dissolved fully when autoclaved at 125° C. for 25 minutes. Gelling (82° C.) and melting (88° C.) temperatures were determined.

4. In a similar manner (after making the necessary adjustments in the required volume of 12M NaOH), 25 g of the same curdlan was derivatized using 12.5 ml of the 2-chloroethanol. Twenty-three grams (92.0% yield) was recovered and ground through a 40 mesh (420 micron) screen. This material was water-soluble but required more extensive boiling to fully dissolve and formed a reversible, clear and elastic gel. Gelling and melting temperatures were determined to be 75° C. and 89° C. respectively.

5. In a similar manner, again making adjustments in the volume of 12M NaOH, 25 g curdlan was derivatized using 30 ml of the 2-chloroethanol reagent. After recovery, 22.35 g (89.4% yield) of the hydroxyethyl material was ground. This material was also boiling-water soluble. A 2% solution did not immediately gel when cooled to 3° C. and held at that temperature over-night. It did form a weak gel upon standing for several hours at room temperature. The melting temperature was determined to be 81.5° C. A 5% solution of this material formed a somewhat tougher gel upon cooling to room temperature. The results of the foregoing are shown in the following table.

PHYSICAL PROPERTIES OF HYDROXYETHYL CURDLANS

| Moles Chloroethanol/ 25 G Curdlan | Gel Strength | Gelling Temperature | Melting Temperature |
|---|---|---|---|
| 0.149 moles | 260 g/cm$^2$ | 51 | 88° C. |
| 0.149* | NA | 83 | 90 |
| 0.186 | 228 | 75 | 89 |
| 0.224 | 234 | 67 | 83 |
| 0.298 | 253 | 54.5 | 91 |
| 0.298* | NA | 72 | 88 |
| 0.448 | Did Not Break | Gel ≡ Rm Temp, Not @ 3° | 81.5 |

Notes
Gel Strengths taken at 2%
Gelling and melting temps determined at 1.5%
*from sodium salt form, after dissolution, neutralization and recovery 6. Hydroxyethyl Derivative Production Using the procedure described in modification 2 above, 50 g of curdlan was hydroxyethylated using 30 ml of 2-chloroethanol (0.448 moles). The product was analyzed for moisture (6.97%) and ash (1.51%) content as well as gelling (60°–70° C.) and melting (90°–96° C.) temperatures.

7. Hydroxyethyl Derivative Production

Using the procedure described in modification 1 above, 50 g of curdlan was hydroxyethylated using 40 ml of 2-chloroethanol (0.596 moles). This material was also analyzed for moisture (8.68%) and ash (1.14%) as well as gelling (61.5°–75° C.) and melting (91°–99° C.) temperatures.

8. Glyceryl Derivative Production

Using the same procedure as in modification 2 above, 50 g of curdlan was derivatized using 50 ml of glycidol (0.754 moles). This glyceryl derivative was analyzed for moisture (7.02%) and ash (1.28%) content as well as gelling (44.5° C.) and melting (88.5° C.) temperatures.

9. Hydroxyethylation Of irradiated Curdlan

Five g of irradiated (300 Krad) substantially pure curdlan was suspended in 95 ml distilled water. To this 0.8 ml of 4.4M NaBH$_4$ in 14M NaOH was added, followed 7 minutes later by 3 ml of 12M NaOH and 4 drops 1-octanol (antifoam). The mixture was heated in a 75° C. water bath for 30 minutes. An additional 200 uL of the NaBH$_4$ solution was added followed by an additional 3.75 ml of the 12M NaOH. A solution containing 3ml 2-chloroethanol and 10 ml water was added dropwise over a 6 minute period. The reaction vessel was covered and stirring continued for 60 minutes. Final temperature was 78° C. Twenty-five ml of 9° C. water was added, lowering the solution temperature to 65° C. and the sample was coagulated in 2×volumes of 99% IPA containing 31.8 ml 3M acetic acid. The coagulum was recovered by vacuum filtration and transferred to 2×volumes of 70% IPA for 30 minutes. The coagulum was again recovered, squeezed to remove excess liquid and then dried at 55° C. overnight. The dried material (4.41 g or 88.2% yield) was ground through a 40 mesh (420 micron) screen. The sample proved to be fully soluble in both 0.5X TBE and 1x TAE buffers but the gelling point was excessively high. The solution remained fluid only during a rolling boil and began gelling immediately when removed from the heat source.

Glyceryl

1. Four milliliters 4.4M NaBH$_4$ in 14M NaOH was added to 25 g substantially pure curdlan in 440 ml distilled water. One hundred and fifty-six milliliters 1.2M NaOH was added followed by 10 drops antifoam. The solution was heated to 74° C. and maintained for 30 minutes. A mixture of 12.5 ml anhydrous glycidol (Lot #24F-3437, Sigma Chemical Co., St. Louis, Mo.) in 15 ml distilled water was added dropwise over a 6 minute period to the vortex of the reaction solution. The reaction vessel was covered and the solution stirred for 70 minutes. Final temperature was 76° C. The solution was cooled to 56° C. in an ice bath and then coagulated in 3×volume 99% isopropyl alcohol, previously acidified with 94 ml 5M acetic acid. The coagulum was recovered by vacuum filtration through polyester cloth and then squeezed to remove excess liquid. The coagulum was transferred to 3×volume 80% isopropyl alcohol for 30 minutes. The coagulum was recovered as above and then dried at 55° C. for 20 hours yielding 23.22 g (92.9% yield) which was ground through a 40 mesh (420 micron) screen. One gram of this material was placed in 90 ml distilled water and stirred initially without heat and then with strong heat. There was no apparent water solubility, so 10 ml 1.0N NaOH was added. The majority of the sample dissolved except for a number of small white particles. This material was heated to 55° C. and neutralized with 5M acetic acid. A very weak, sticky gel (no measurable gel strength) formed upon cooling which proved to be reversible upon heating. The dried product dissolved readily in room temperature 8.5M urea.

2. The above modification was repeated using substantially pure curdlan and using 25 ml of the glycidol reagent (in 30 ml distilled water). Another variation was that an additional 1 ml of the NaBH$_4$ solution was added prior to the addition of the glycidol reagent (total NaBH$_4$ volume was 4 ml). Reaction times and temperatures were the same. The dried material (25.61 g, 102.4% yield) was recovered and ground through a 40 mesh (420 micron) screen. A suspension of 0.5 g of this material in 50 ml distilled water was heated to boiling. The material dissolved fully and upon cooling in an ice bath, formed a clear, weak, sticky gel. This gel was thermoreversible as it melted when heated. A piece of this gel dissolved fully when placed in 6M urea. Additionally, the dried sample dissolved readily in 8.5M urea at room temperature.

Glycerol, Ethylene Glycol, Butane Diol

1. Twenty-five grams of substantially pure curdlan was suspended in 440 ml distilled water. One and a half milliliters 4.4M NaBH$_4$ in 14M NaOH was added. One hundred and fifty-six milliliters of a solution containing 7.5 g NaOH was added, the beaker covered and the mixture heated, with stirring, to 75° C. in a hot water bath. An additional 1.5 ml of the NaBH$_4$ solution was added. The solution temperature reached 80° C., the cover was removed allowing the material to cool to 71° C. Sixty minutes after the initial addition of the borohydride, 12.5 ml glycerol (lot #6276, EM Science, Cherry Hill, N.J.) in 15 ml distilled water was added dropwise. The beaker was covered and allowed to incubate with stirring. Final temperature 78° C. The solution was cooled in an ice bath to 60° C. and coagulated in 3×volume (1950 ml) 99% isopropyl alcohol, previously acidified with 156 ml 3M acetic acid. The coagulum was recovered by vacuum filtration on polyester cloth and transferred to 3×volume 80% isopropyl alcohol for 20 minutes. The coagulum was recovered by filtration, the excess liquid squeezed out and then the sample was dried at 55° C. in a forced air oven for 18 hours. The dried product (22.07 g, 88.27% yield) was recovered and ground through a 40 mesh (420 micron) screen. This material was not soluble in water at room temperature or at the boiling point. The material did demonstrate properties different from the parent curdlan. The treated material was not fully soluble in 0.1N NaOH as a few small white particles would not dissolve. A 2% solution was prepared by dissolving 0.5 g in 22.5 ml 1.0N NaOH. A gel was formed by heating the solution to 55° C. and neutralizing with 2.5 ml 9.8M acetic acid followed by cooling in an ice bath. The gel was more opaque, whiter in color, than gels formed from the parent curdlan. Additionally, the gel was more brittle and less elastic than the parent material. Gel strength on this sample was 121 g/cm$^2$ compared to a value of 230 g/cm$^2$ for a 2% gel prepared from the parent material. Gel strength at 1% was 28 g/cm$^2$. A small piece of the gel was placed in 8.5M urea to check the stability to chaotropic agents. The gel remained intact. Additionally, when 0.05 g of the powder was placed in 5 ml of 8.5M urea the sample dissolved with gentle heating. Upon cooling, the sample formed a clear, weak gel. A control experiment was performed which duplicated the conditions described above. The only difference was that glycerol was not added to the reaction mixture. A 1% gel prepared from this material was weak (24 g/cm$^2$). Although the dried sample was soluble in 8.5M urea, it was not fully soluble in 6M urea.

2. In a similar manner, modification 1 above was repeated using 1,2-butane diol in place of the glycerol. A mixture of 25 ml (0.279 moles) 1,2-butane diol (Aldrich Chemical Co., Milwaukee, Wis., lot #6117KH) in 25 ml distilled water was added to the curdlan solution following the 30 minute alkaline activation period and then incubated for 60 minutes. The sample was coagulated, recovered and dried as previously described. The procedure produced 23.82 g representing a 95.3% yield. This material was insoluble in water (room temperature and boiling). The material did dissolve in base and a gel was prepared by the normal method and then tested for gel strength. A gel strength of 52 g/cm$^2$ was obtained for a 1% gel. The same gel was tested to determine if it was thermoreversible or if it formed a heat-set gel when heated to high temperatures. The gel, when placed in an 80° C. water bath for 30 minutes, did not melt but instead formed a heat-set gel. This was tested for gel strength which was determined to be 87 g/cm$^2$. This material (the dried powder) also proved to be fully soluble in 8.5M urea when heated slightly. Upon cooling to room temperature, it formed an opaque gel with a breakforce of 96 g/cm$^2$, when tested in 6M urea it was not fully soluble, despite heating, but still formed a weak gel upon cooling to room temperature. Both gels were thermoreversible when heated in a hot water bath.

3. The procedure described in modification 1 above was repeated with one change, that is, a mixture of 25 ml distilled water containing 15 ml (0.269 moles) ethylene glycol (J.T. Baker Chemical Co., Phillipsburg, N.J., lot #637610) was added after the alkaline activation. The dried material (23.82 g, 95.3% yield) was water insoluble but a 1% gel formed from a neutralized alkaline solution had a gel strength of 60 g/cm$^2$. It also formed a heat-set gel with a gel strength of 101 g/cm$^2$. The powder was also fully soluble in 8.5M urea when heated. It would not form a gel at room temperature but quickly formed a gel upon refrigeration. Despite heating, the material was only partially soluble in 6M urea. It did form a weak gel at room temperature. The following tables indicate the molar ratios and usage of various derivatizing reagents.

| MOLAR RATIOS OF DERIVATIZING REAGENTS | | | |
|---|---|---|---|
| REAGENT | MOL. WT (g/mole) | DENSITY (g/cm$^3$) | MOLAR VOLUME (ml/mole) |
| 2-chloroethanol | 80.51 | 1.201 | 67.036 |
| Glycerol | 92.10 | 1.261 | 73.037 |
| Glycidol | 74.08 | 1.117 | 66.321 |
| Propylene Glycol | 76.10 | 1.036 | 73.456 |

MOLAR RATIOS OF DERIVATIZING REAGENTS

| REAGENT | MOL. WT (g/mole) | DENSITY (g/cm$^3$) | MOLAR VOLUME (ml/mole) |
|---|---|---|---|
| 1,2-Butane Diol | 90.12 | 1.006 | 89.583 |
| Ethylene Glycol | 62.07 | 1.113 | 55.768 |

MOLAR USAGE OF DERIVATIZING AGENTS

| Volume Used | Moles Used | Notes On Product |
|---|---|---|
| 2-CHLOROETHANOL | | |
| A. 10 ml | 0.149 | Fully soluble upon autoclaving |
| B. 12.5 | 0.186 | Hot water soluble |
| C. 15 | 0.224 | " |
| D. 20 | 0.298 | " |
| E. 30 | 0.448 | " |
| GLYCEROL | | |
| A. 12.5 | 0.171 | Not water soluble |
| GLYCIDOL | | |
| A. 12.5 | 0.188 | Not water soluble |
| B. 25 | 0.377 | Hot water soluble |

Example 12

Use Of Hydroxyethyl Curdlan As An Electrophoresis Medium

A 4% solution of hydroxyethyl curdlan was prepared by dissolving 3 g of material, obtained by the procedure outlined in the first modification in Example 11, in 75 ml distilled water. The solution was cast into a mini submarine gel electrophoresis chamber and allowed to cool. The gel was equilibrated in 0.5x TAE buffer for 90 minutes. Lanes were loaded with the following types and amounts of DNA; 2250 ng pBR322-Msp I (New England BioLabs, Beverly, Mass.), 1125 ng pHIX174/HAE III (Bethesda Research Laboratories, Gaithersburg, Md.), 750 ng 123 base pair ladder (Bethesda Research Laboratories, Gaithersburg, Md.) and 200 ng X Hind III (Bethesda Research Laboratories, Gaithersburg, Md.). Electrophoresis was carried out for 60 minutes at 80 volts (6.67 V/cm). The bromophenol blue tracking dye migrated through the gel whereas it does not do so in non-derivatized curdlan. The dye front was at 5.3 cm. The gel was stained and destained although the destaining time was doubled. Fragments of DNA, ranging in size from 34 to 1078 base pairs were resolved. Fragments outside this range were either not detectable or were not resolved under these conditions.

Modification

Prelude: Neutralization And Recovery Of Sodium Salt Form

The material used in the next experiment was derived from a sodium salt form of curdlan, obtained using the procedure in Example 11 in which 25 g of the curdlan was modified with 20 ml 2-chloroethanol and then coagulated in non-acidified alcohol. Ten g of that salt was dissolved in 900 ml distilled water, heated to 55° C., neutralized with 9.8M acetic acid and then .coagulated in 2×volume 99% isopropyl alcohol. The material was recovered by centrifugation, washed in 2×volume 70% isopropanol, recovered as before, dehydrated in 2×volume 99% isopropanol, recovered and dried at 60° C. for 18 hours yielding 6.826 g (68.3%). This material was used in the following experiment.

1. A 4% NuSieve® 3:1 agarose gel (FMC Corporation, Philadelphia, Pa.), in 1x TBE buffer, was cast in an horizontal electrophoresis chamber (model #850, Aquebogue Machine Shop, Aquebogue, N.Y.). Two strips of 3 lanes were cut out, leaving the wells intact. Solutions of hydroxyethyl curdlan were prepared at 6% and 8% concentrations by boiling 1.5 and 2.0 g of the material described above in 25 ml 1x TBE buffer contained in tared beakers. After complete dissolution, the solutions were reweighed and lost volume replaced with distilled water. These solutions were used to fill the cutout lanes and allowed to cool. The gel was flooded with additional buffer and three lanes of each gel type were loaded with the following DNA markers; pBR322-Msp I at 1500 and 2100 ng loading levels and 900 ng pHIX174/HAE III. One hundred twenty volts (3.5 V/cm) was applied for 230 minutes. Dye fronts in the individual gel were as follows; 11.5 cm (6% curdlan), 10.3 cm (8% curdlan) and 12.3 cm (4% agarose). The gel was stained for 30 minutes and destained overnight. Migration patterns were similar in all three while mobility was fastest in the 4% agarose, and slowest in the 8% hydroxyethyl curdlan. Diffusion of the bands was evident in all gels (due to the overnight destain) although it was considerably less in the two curdlan gels which still had sharp bands. Despite the high concentration, the 8% curdlan gel was flexible enough to roll into a tube whereas the agarose gel split when folded slightly.

2. Electrophoretic Comparison of Curdlan Derivatives

A 2% LE agarose framing gel (in 0.5x TBE was cast in a horizontal submarine chamber (model 850, Aquebogue Machine Shop, Aquebogue, N.Y.) using a 9 lane slot former. Samples of various curdlan derivatives were prepared in 0.5x TBE buffer at 3% concentration. The samples were as follows:

| Sample | Moles Reagent/25 g Curdlan | Example Reference Number* |
|---|---|---|
| Hydroxyethyl | 0.186 | Ex. 11-4 |
| Hydroxyethyl | 0.224 | Ex. 11-6 |
| Hydroxyethyl | 0.298 | Ex. 11-7 |
| Hydroxyethyl | 0.448 | Ex. 11-5 |
| Glyceryl | 0.377 | Ex. 11-8 |

*all under Hydroxyethyl heading

The slot former was removed from the framing gel and the lanes were filled with the samples indicated above. The remaining 3 lanes were filled with a 3% LE agarose solution. After gelling, the gel was flooded with 0.5x TBE buffer and each lane loaded with 4 μl of φX174 HAE II (150 ng/μl). Voltage was applied at 5 V/cm (172 volts) for 110 minutes. The gel was stained with ethidium bromide and then destained in water. Results indicated that the glyceryl derivative was equivalent to the agarose control in sieving. The sieving ability of the first three hydroxyethyl derivatives increased with increasing levels of substitution and were all more sieving than the agarose control. However, the last and most highly substituted hydroxyethyl derivative was least sieving and was less sieving than the agarose.

3. Glyceryl Curdlan as an Electrophoretic Medium

A 4% NuSieve® 3:1 gel, in 1x TAE buffer, was cast in a model 850 horizontal submarine chamber (Aquebogue Machine Shop, Aquebogue, N.Y.). After gelling, 6 lanes were cut out and filled with a 3.5% solution of glyceryl curdlan (Ex. 11-8). The chamber was flooded with buffer and wells were loaded with 1, 2 and 3 μl volumes of pBR322 Msp I digest (250 ng/μl). The samples were electrophoresed for 4 hours at 3.5 V/cm. As seen above, the sieving ability of the glyceryl curdlan was very similar to the agarose control as band mobility in each matrix was almost identical. Additionally, the curdlan gel was able to resolve the 238/242 base pair fragments whereas the agarose gel was unable to do so. The glyceryl curdlan gel was very flexible while the agarose gel was somewhat fragile.

Example 13

Solubility of Curdlan

Prelude: Dissolution of Curdlan

It has been shown in Example 5 that alkaline curdlan solutions, containing dissolved chaotrope, will form gels if neutralized and cooled. It has also been shown that curdlan only dissolves in alkaline solutions (≡pH 10.7 or greater) or polar organic solvents such as dimethylsulfoxide (DMSO). It has also been shown that water-soluble curdlan can be isolated by coagulating an alkaline curdlan solution (Example 9) in alcohol, or if the curdlan is suitably derivatized (Example 11).

Because urea is commonly used in electrophoresis to denature proteins and single stranded DNA, it is desirable to dissolve the curdlan directly in urea. A problem is that urea is heat unstable and generates ammonia, which alkalinizes the curdlan sol and causes it to gel prematurely. A solution to this problem is to keep the temperature low.

To dissolve curdlan in urea and to avoid clumping, one should control (a) the rate of addition (that is, dissolution of the curdlan) and (b) the heat of the solution during addition (both the rate of heat increase and the final temperature); and (c) accompany the dissolution with agitation (preferably stirring).

Solubility and Gelation in Chaotropes

A small sample (0.05 g) of curdlan, previously reacted with glycerol (Example 11) was suspended in 5 ml of 8.5M urea and gently heated. The sample eventually dissolved fully. Furthermore, a weak gel formed upon cooling. In an effort to repeat this, 0.6 g of the same material was placed in 20 ml of 6M urea and heated. Despite prolonged boiling, the solution remained cloudy. Additional dry urea was added and heating continued. The curdlan dissolved fully but due to excess urea, the solution crystallized upon cooling.

Modifications

1. A series of experiments were performed to determine the solubility of various curdlan samples in 6M and 8.5M urea. In each case, 0.25 g of the curdlan was suspended in 25 ml of the dissolved chaotrope. The samples were allowed to stir at room temperature for 30–45 minutes to determine if the curdlan would dissolve at this temperature. If undissolved particles remained after this period, the sample was heated slowly and gently and then more vigorously if dissolution was not complete. The dissolved (or partially dissolved) samples were allowed to cool at room temperature and remain there for several hours. If no gelation occurred, the sample was refrigerated overnight and rechecked for gelation. The gel was checked for gel strength (if suitably formed), reversibility and heat-setting ability. A summary of the results can be found in Table 5 below but several observations are made here. Each of the nine samples was soluble in 8.5M urea, although most required heating. All of the samples subsequently gelled except for those samples which were water-soluble (that is hydroxyethylated curdlan) and those reacted with glycidol. All gels formed in both 6M and 8.5M urea were reversible and did not form heat-set gels. Only three samples formed firm gels in the 8.5M urea; crude, purified, and ethylene glycol-reacted curdlan. Other gels were quite weak. The crude curdlan was the sole sample to form a firm gel in the 6M urea. Only four of the samples dissolved fully in 6M urea while the others dissolved to varying degrees. All gels were opaque in nature with one notable exception; the substantially pure curdlan formed crystal clear gels. It was also determined that curdlan was soluble only if the urea solutions were initially at room temperature and then subsequently heated (if needed). When the urea solution was heated (80° C.) prior to the addition of the curdlan, the sample would not dissolve. Furthermore, it appears as if the rate and/or degree and/or length of heating (and possibly cooling) used in dissolution (and in gelation) affects the strength of the gel.

TABLE 5

SOLUBILITY OF CURDLAN AND DERIVATIVES IN 8.5M UREA

| SAMPLE | LOT # | SOLUBILITY | GEL FORMATION ROOM TEMP | COLD | NOTES |
|---|---|---|---|---|---|
| Glycidol | E7003-151 | Room Temp | no | no | |
| Glycidol | E7003-141 | Room Temp | no | no | |
| Glycerol | E7003-137 | With Heat | no | yes | weak, opaque |
| Glycerol Control | E7003-148 | With Heat | no | yes | weak, opaque |
| Butane Diol | E7142-2 | Mostly @ R.T. | yes | — | 96 g/cm$^2$ |
| Purified | PP0417 | With Heat | no | yes | sticky, clear |
| Purified | PP0404 | With Heat | no | yes | 181 g/cm$^2$ elastic |
| Crude | RF08 | With Heat | yes | — | 235 g/cm$^2$ |
| Hydroxyethyl | E7003-126 | Room Temp | no | no | |
| Ethylene Glycol | E7142-3 | With Heat | no | yes, fast | 85 g/cm$^2$ |
| 900 Krad | E7003-18 | With Heat | no | yes | weak, opaque |
| Sodium Salt | E7003-16 | Room Temp | no | no | gelled after neutralization |

SOLUBILITY OF CURDLAN AND DERIVATIVES IN 6M UREA

| SAMPLE | SOLUBILITY | GEL FORMATION ROOM TEMP | COLD | NOTES |
|---|---|---|---|---|
| Glycidol | Room Temp | no | no | |
| Glycidol | Room Temp | no | no | |
| Glycerol | Low, With Heat | yes, slow | | Weak, opaque |
| Glycerol Control | Low, With Heat | no | no | |
| Butane Diol | Partial, | yes, slow | | Weak, opaque |

TABLE 5-continued

| | With Heat | | | |
|---|---|---|---|---|
| Substantially Pure | Partial, With Heat | yes | | Sticky, clear |
| Crude | With Heat | yes | | 173 g/cm² |
| Hydroxyethyl Ethylene Glycol | Room Temp Partial, With Heat | no yes | no | Weak, opaque |

2. To check the solubility and gel forming ability of curdlan in other chaotropic agents, 0.25 g of crude and substantially pure curdlan samples were suspended in 25 ml 4M guanidine isothiocyanate (Sigma Chemical Co., St. Louis, Mo., lot #1 109F0050) at room temperature. After 30 minutes, gentle heating was applied at which time the samples dissolved fully. Upon cooling to room temperature, both solutions formed weak crystal clear gels. They were both reversible and did not heat-set.

3. When the concentration of guanidine isothiocyanate was reduced to 0.5M, the curdlan did not appear to dissolve. When the swollen particles were removed by filtration, the filtrate did not form a coagulum in 99% isopropyl alcohol.

4. One gram of substantially pure curdlan was suspended in 100 ml of 3M lithium iodide which had a pH of 10.3. This was heated to boiling where it fully dissolved. A portion (50 ml) was neutralized at 55° C. A firm gel formed rapidly upon cooling and had a gel strength of 234 g/cm². The gel was also found to be reversible. When a portion of this cold set gel was heat set as in Example 5, the gel melted and reformed a gel when again cooled. The gel strength was 280 g/cm². Another portion of the cold set gel was washed as in Example 5 resulting in a gel with a gel strength of 159 g/cm².

5. The solubility of substantially pure curdlan, degraded by irradiation (900 Krad dose), was also examined. After heating, the sample dissolved fully in the 8.5M urea but not in the 6M solution. The dissolved sample was neutralized at 55° C. but did not form a gel. This solution was placed in dialysis tubing and placed in 2 liters distilled water where it gelled after several hours. A second sample was dissolved in 8.5M urea but was not neutralized. It formed a weak opaque gel upon chilling. The gel was found to be reversible as it melted upon heating and subsequently gelled after chilling.

6. A water soluble sodium salt of substantially pure curdlan was tested in 8.5M urea for both solubility and gelation. A 0.25 g sample was placed in 25 ml of the chaotrope where it readily dissolved at room temperature. Solution pH was ≅10 as indicated by pH test paper. The sample did not gel at room temperature nor upon refrigeration. The sample was heated to 55° C. and neutralized with several drops of 5M acetic acid. Upon chilling it formed a reasonably clear gel with a gel strength of 52 g/cm². The gel melted fully when heated.

7. To examine the effects, if any, of removing the chaotrope from a gel dissolved and formed in such a material, two gels were prepared by dissolving 0.25 g crude curdlan in 6M and 8.5M urea solutions. The gels were removed from the beakers and each was washed in 4 liters distilled water for 24 hours. After suitable chilling, the gels were tested for gel strength. The 6M urea gel had a gel strength of 798 g/cm² while the 8.5M gel had a gel strength of 922 g/cm². To determine the thermal stability of the gels, they were placed in a boiling water bath for 30 minutes. The gels were thermally stable and did not melt. To determine the effect of removing guanidine isothiocyanate from a gel dissolved and formed incorporating such a reagent, a gel was prepared by dissolving 0.25 g substantially pure curdlan in 4M guanidine isothiocyanate solution (25 ml). The gel was clear and very sticky, therefore, the gel was left in the beaker when washed in 2 liters of distilled water for 24 hours. The distilled water was changed 3–4 times. After 20 hours of washing with the gel remaining in a beaker, the gel was removed from the beaker and washed for an additional 4 hours. After suitable chilling, the gel strength was measured as 309 g/cm². When this gel was heat set in a boiling waterbath for 20 minutes, the gel melted completely before heat setting.

8. Under certain conditions, such as when the suspension is heated directly and rapidly after suspension in the chaotrope, under conditions possibly leading to some of the material heat-setting, partial solubility of substantially pure curdlan was observed in 8 and 8.5M urea solution. This fact enabled a crude separation based on urea solubility. An 8.5M urea solution was formed by dissolving 51.05 g of urea (lot #48F-0235 from Sigma Chemical, St. Louis, Mo.) in 75 ml distilled water and then the volume of solution was brought up to 100 ml with distilled water, giving a final molar concentration of 8.5M. The pH was 8.3. One gram of substantially pure curdlan was added to the 8.5M urea solution and heated to boiling on a hot plate with constant stirring. The insoluble curdlan was filtered out using a polyester cloth, with vacuum suction, with the soluble portion being collected in a 500 ml flask. The urea soluble curdlan was coagulated in 200 ml of 99% isopropyl alcohol. The coagulated curdlan was centrifuged at 7500 rpm for 10 minutes, then washed for 30 minutes in 99% isopropyl alcohol (200 ml). The coagulum was recovered by vacuum filtration through a polyester cloth, squeezing out the excess alcohol. Following recovery, the curdlan was dried at 55° C. overnight. The recovered curdlan, 0.656 g, was ground in a Thomas-Wiley mill through a 40 mesh (420 micron) sieve. A 1% basic aqueous solution was prepared using the recovered curdlan. This solution was neutralized at 55° C. and allowed to cool. However, no gel would form when this was refrigerated. When this solution was dialyzed against distilled water (2 1) for 6 hours, a weak gel formed.

9. Denaturing Gel Electrophoresis

A denaturing curdlan gel was prepared by suspending 0.5 g substantially pure curdlan in 25 ml of a 1x TAE/7M urea buffer. The curdlan was allowed to stir at room temperature for 15–20 minutes and then was heated, gently and slowly at first, eventually bringing the solution to a boil. The solution was cast in a mini-submarine chamber and allowed to cool. Once gelled, it was flooded with buffer and stored in the refrigeration overnight. The next morning, the buffer was changed and the gel allowed to warm to room temperature. A solution of γ HIND III was prepared in 1x TAE/7M urea with added tracking dye. Wells were loaded with 5 μl or 200 ng of DNA and 4 V/cm was applied for 2 hours. Following staining and destaining, it was observed that there had been very little movement of the DNA. The three smallest bands (0.56, 2.0 and 2.3 kb) were seen as very distinct and sharp bands.

10. Denaturing Curdlan Gel Formation in a Formamide/Urea Solution

To examine the possibility of using curdlan as a matrix in denaturing gradient electrophoresis, it was necessary to test first curdlan's ability to form gels in a 7M urea/40% formamide solution. Therefore, 4.20 g of urea were dissolved in ≅3 ml dionized water. The volume was adjusted to 6 ml and 4 ml formamide was added to bring the volume to 10 ml and the concentration of urea to 7M and the formamide to 40%. To this solution, 0.1 g substantially pure curdlan was stirred in and gently heated until fully dissolved. The sample was refrigerated, upon which a very clear and weak gel formed. To further examine curdlan's capacity for gelation in a wider range of denaturant concentration, 0.2 g of substantially pure curdlan was suspended in 20 ml of 3.5M urea/20% formamide solution and heated gently until dissolved. Upon cooling to room temperature, an opaque gel formed. Additionally, 0.05 g of the same curdlan was suspended in 5 ml 100% formamide and heated gently. The sample fully dissolved and upon cooling to room temperature, formed a clear gel.

11. Melting and Gelling Temperature Determination for Curdlan in Urea

The melting temperature of a 1% curdlan gel, made by direct dissolution and gelation in 7M urea, was determined. A 0.25 g sample of substantially pure curdlan was suspended in 25 ml of 7M urea and dissolved by slow, gentle heating. The sample was transferred to a test tube and a thermometer inserted. The sample was gelled in the refrigerator and then placed in a water bath and gently heated. Melting temperature was determined to be 19° C. In a separate experiment, the gelling and melting temperature of a 1.5% curdlan gel in 7M urea, gelled by the critical temperature neutralization (CTN) method, was also determined. To 22 ml of a 7M urea solution, 0.375 g of substantially pure curdlan and 2.5 ml of 1.0N NaOH was added. Once dissolved, the sample was heated to 55° C. and neutralized with 0.5 ml of 5M acetic acid. The sample was poured into a test tube and refrigerated until gelled. The gel was placed in a water bath and gently heated. The gel melted at 25° C. Once fully melted, the sample was cooled and a gelling temperature obtained (15° C.).

Example 14

Electrophoresis in a Gel Formed in Urea

One gram of irradiated substantially pure curdlan (600 Krad) was suspended in 25 ml 8.5M urea and stirred for 10 minutes. The beaker was then placed in a water bath and gentle heat was applied until the sample was fully dissolved. The solution was de-gassed to remove air bubbles and then used to cast a gel 4 mm thick in a submarine mini-chamber. The entire unit was refrigerated for 1 hour, upon which the sample formed a firm clear gel. The chamber and gel were immersed in 2 liters of distilled water and the urea was washed out for 15 hours. The water was changed and the gel washed for an additional 2 hours. The 8 lane gel was cut in half and one of these was placed in the mini-chamber. A 4% NuSieve® agarose gel (3/1 blend) in 1x TBE buffer was poured around the curdlan insert. The gel was then flooded with 1x TBE buffer and allowed to equilibrate for 2 hours. Curdlan lanes were loaded with 450 and 600 ng samples of pBR322 Msp I digest and pHIX174 Hae III DNA digests. The 2 agarose wells were loaded with 600 ng of the pBR322 sample and 450 ng of the pHIX174 digest. The samples were electrophoresed at 60 volts (4.28 V/cm) for 80 minutes. The tracking dye front in the agarose was 5.2 cm; it did not migrate in the curdlan. The gel was stained for 15 minutes in ethidium bromide (1 ug/ml), rinsed with water and then destained for 15 minutes. The gel was examined and photographed under UV light. Analysis of the photo showed good separation and resolution of DNA fragments differing by as few as 10 base pairs. Overall results, including rate of migration, were comparable to the agarose gel.

Example 15

Partially depolymerized curdlan

Gamma irradiation:

Preparation of gels of partially depolymerized crude curdlan at 1% and 5% for 200 Krad irradiated material was essentially the same as in Example 2 except that 0.5M NaOH was used to dissolve the irradiated crude curdlan. The 5M acetic acid used to neutralize the curdlan solution at 55° C. was preheated to 55° C. At 5% concentration, crude curdlan treated with 200 Krad, gelation occurs immediately after neutralization. The gel strengths increased with increased concentration of irradiated curdlan, 57 g/cm$^2$ at 1% and 614 g/cm$^2$ at 5% irradiated crude curdlan.

Modifications

1. Same as above except that the crude curdlan was treated with 600 Krad of radiation. With increased depolymerization (600 Krad), the gel strength decreased. For a 1% gel prepared using crude curdlan treated with 600 Krad, the gel strength was 12 g/cm$^2$ and 346 g/cm$^2$ at 5%.

2. Same as above except that the crude curdlan treated with radiation at 200 Krad and 600 Krad was purified as in Example 4. Gels were formed at 1% –4% resulting in gel strengths shown below.

| Gel Strengths for Irradiated Substantially Pure Curdlan | | |
|---|---|---|
| % Curdlan | 200 Krad (g/cm$^2$) | 600 Krad (g/cm$^2$) |
| 1 | 45 | 24 |
| 2 | 196 | 53 |
| 3 | 253 | 97 |
| 4 | 424 | |

Electrophoresis with Irradiated Hydroxyethylated Curdlan

Hydroxyethylated curdlan prepared in Example 11–6 was irradiated at a 600 Krad level. A 4% NuSieve® 3:1 gel in 1x TBE was cast in a mini-chamber. The three center lanes were removed and filled with a 6% solution of the irradiated hydroxyethylated curdlan. Solution viscosity was low and the gelling temperature, although still high (≅72° C.), was much better than the hydroxyethylated irradiated material of Example 11-9. The curdlan wells were loaded with 600, 900 and 1200 ng quantities of pBR322 Msp I while the agarose wells were loaded with 900 ng. The samples were electrophoresed by applying 60 volts for 135 minutes. After staining and destaining, the gel was examined. DNA mobility was retarded significantly more in the curdlan gel than in the agarose. Resolution was good and band sharpness was good, especially with the larger fragments (>140 bp). The curdlan gel was also vastly superior in handling characteristics.

Effect of Irradiation Level on Sieving in Native Curdlan

A 2% LE agarose framing gel (in 0.5x TAE) was poured into a model 850 horizontal submarine chamber. A slot former was used to create 9 lanes. The lanes were filled with neutralized solution of 2% curdlan, each having received a different level of irradiation (50–900 Krad). Additional lanes were filled with native curdlan and 2% LE agarose. The gel was then flooded with buffer and wells loaded with 3 μl of Hind III γ DNA at 150 ng/μl and finally electrophoresed at 140 volts for 2 hours. The gel was stained and destained as previously described. Fragment mobility was measured for each of the gels. The results of the foregoing are shown in the following table.

| #base pairs | Native | 50 Krad | 100 Krad | 200 Krad | 300 Krad | 600 Krad | Agarose |
|---|---|---|---|---|---|---|---|
| 23.1 kb | 0.54 | 0.60 | 0.66 | 0.75 | 0.66 | 0.66 | 0.48 |
| 9.4 | 0.63 | 0.72 | 0.78 | 0.84 | 0.81 | 0.81 | 0.54 |
| 6.6 | 0.69 | 0.78 | 0.87 | 0.96 | 0.90 | 0.90 | 0.57 |
| 4.3 | 0.75 | 0.90 | 0.99 | 1.11 | 1.02 | 0.99 | 0.60 |
| 2.3 | 1.02 | 1.17 | 1.32 | 1.44 | 1.35 | 1.32 | 0.78 |
| 2.0 | 1.11 | 1.26 | 1.44 | 1.56 | 1.47 | 1.44 | 0.84 |
| 0.56 | 2.28 | 2.40 | nd | nd | nd | nd | nd | kb = kilobase pairs nd = fragment not detected
bands in the 900 Krad irradiated curdlan gel were smeared and not measurable 3. Same as modification 2 above except that the gels were heat set as in Example 5. The gel strengths of these gels increased by heat setting the gels. See results below.

| % Curdlan | 200 Krad (g/cm²) | 600 Krad (g/cm²) |
|---|---|---|
| 1 | 58 | 46 |
| 2 | 239 | 118 |
| 3 | 381 | 124 |
| 4 | 815 | |

4. Same as modification 2 above except that the gels contained chaotropic agents as in Example 5. The gel strength of these gels increased with the addition of chaotropic agents with or without further treatment. See results below.

| Gel Strength of Irradiated Curdlan (Crude and Substantially Pure) g/cm² | | | |
|---|---|---|---|
| Curdlan Sample | Chaotrope | Cold Set | Cold Set/Washed |
| 5% Crude 200 Krad | 0.5M LiI | 672 | |
| | 6M Urea | 567 | |
| | 1M Guanidine HSCN | 962 | |
| 5% Crude 600 Krad | 0.5M LiI | 254 | |
| | 6M Urea | 223 | |
| | 1M Guanidine HSCN | 522 | |
| 4% 200 Krad Substantially Pure | 0.5M LiI | 593 | 565 |
| | 6M Urea | 532 | 540 |
| | 1M Guanidine HSCN | 569 | 686 |
| 3% 600 Krad Substantially Pure | 0.5M LiI | 188 | 202 |
| | 6M Urea | 248 | 278 |
| | 1M Guanidine HSCN | 198 | 274 |

5. 1% Cold set gels were prepared, as in Example 2 for substantially pure curdlan that had been treated with varying doses of gamma radiation. The viscosity of the 1% solutions in 0.1 N NaOH, before neutralization, was measured in a 250 ml capacity beaker using a Brookfield Digital Viscometer. After the viscosity was recorded, the basic curdlan solution was then neutralized to form a cold set gel as in Example 2. The viscosities, measured in centipoises (cps), and the gel strengths of irradiated substantially pure curdlan decreased with increase in the level of irradiation as seen in the results below. A centipoise (cps) is approximately equal to a millePascal-second (mPa-s).

| Viscosity and Gel Strength of Irradiated Substantially Pure Curdlan | | |
|---|---|---|
| Radiation level | Viscosity (cps) | Gel Strength (g/cm²) |
| 50 Krad | 50.8 | 111 |
| 100 Krad | 38.4 | 92 |
| 200 Krad | 21.2 | 73 |
| 300 Krad | 10.9 | 38 |
| 600 Krad | 7.3 | 17 |
| 900 Krad | 5.4 | 10 |

Electrophoresis with irradiated curdlan

To examine the electrophoretic properties of irradiated crude curdlan that had been purified as in Example 4, a 1% agarose gel was prepared in 0.5x TAE and the three middle lanes were removed as in Example 6. This space was filled with a 1% solution (w/v) of crude curdlan treated with 200 Krad and then purified, the sol being formed by suspending 0.20 g in 10 ml distilled water, dissolving by adding 10 ml 1.0N NaOH, heating this solution to 55° C. on a hot plate and then neutralizing with 1 ml 5M acetic acid. The solution was then quickly poured into the agarose framing gel and allowed to cool and solidify. The gel was equilibrated and innoculated with a sample of Hind III γ DNA digest with bromophenol blue as a tracking dye, then electrophoresed as in Example 6. The electrophoresis was performed at 60 volts (5 V/cm) for 75 minutes. The DNA migration in the irradiated curdlan was considerably faster in the curdlan than in the agarose framing gel. The results of the foregoing are shown in the following table.

| | Distance Migrated (mm) | |
|---|---|---|
| DNA Fragment Size (kb) | 1% Agarose | 1% 200 Krad Curdlan |
| 23.1 | 13.0 | 27.0 |
| 9.4 | 15.5 | 36.0 |
| 6.6 | 17.5 | 40.0 |
| 4.3 | 20.5 | 43.0 |
| 2.3 | 27.5 | 52.0 |
| 2.0 | 30.0 | ran off the gel |
| 0.56 | 60.0 | ran off the gel |

Acid Hydrolysis:

A 0.05M HCl solution was prepared by adding 0.5 ml 5M HCl to 49.5 ml distilled water. To this, 2.5 g substantially pure curdlan was added. This solution was stirred with an overhead stirrer while heating in a 50° C. waterbath. Eight gram samples were removed from the curdlan slurry at 0, 30, 60, 90 minutes, and 6 hours. To each 8 g sample of curdlan slurry, 45 ml distilled water was added then 5 ml 1.0N NaOH to dissolve the curdlan. Eight ml of the curdlan solution in base was removed to measure viscosity using a small sample adapter for the Brookfield® Digital Viscometer (Brookfield Engineering Laboratories, Inc., Stoughton, Mass.). The remaining curdlan solution was heated to 55° C. and neutralized with 5M acetic acid. The viscosity and gel strength results are shown below. A control curdlan solution was prepared by dissolving 0.25 g substantially pure curdlan in 22.5 ml distilled water and adding 2.5 ml 1.0N NaOH. This solution was also neutralized to form a gel upon cooling. Heat set gels were prepared by placing in a boiling waterbath for 20 minutes.

| Sample | Viscosity (cps) | Gel Strength Cold Set Gel | Gel Strength Heat Set Gel |
| --- | --- | --- | --- |
| Control | 61.1 | 103 | 167 |
| 0 minutes | 21.2 | 39 | 76 |
| 30 minutes | 45.8 | 55 | 115 |
| 60 minutes | 139.0 | 81 | 109 |
| 90 minutes | 239.0 | 74 | 192 |
| 6 hours | no dissolution | | |

It is interesting to note that, quite unexpectedly, the viscosity increased rather than decreased, indicating a possible polymerization rather than degradation. When the above experiment was done in a boiling water bath, all products were insoluble.

Example 16

Solubility studies (pH effect):

A 1% solution carbonate solution was prepared (1 g/100 ml) in distilled water. The pH of this solution was adjusted to 10.3 by addition of 12 N and 1N hydrochloric acid. To this solution, 1.0 of substantially pure curdlan was added. The curdlan dissolved completely when gently heated on a hot plate with constant stirring. The pH of the hot curdlan solution was 10.7. This solution was then cooled to 55° C. and neutralized with 5M acetic acid. A gel formed when cooled slowly at room temperature. The gel was then placed in the refrigerator for 2 hours. The gel had an elastic structure and a gel strength of 93 g/cm². When this gel was heat set as in Example 5, this gel did not melt before heat setting.

Modification

1. A 1% sodium carbonate solution was prepared as above and the pH adjusted to 10.0. One gram of the above curdlan did not dissolve completely after applying constant heat and stirring for 2 hours.

2. A 1% sodium carbonate solution was prepared as above and the pH adjusted to 10.5. One gram of the above curdlan dissolved with gentle heating and stirring. This curdlan solution was cooled to 55° C. and neutralized as above. The gel was elastic and had a gel strength of 118 g/cm². This gel did not melt completely when heat set and had a gel strength of 148 g/cm².

3. A 1% curdlan solution was prepared in 0.005N NaOH by suspending 2 g of the above curdlan in 199 ml distilled water and adding 1 ml 1.0N NaOH to dissolve the curdlan when heated gently with continuous stirring. The curdlan dissolved within 15 minutes and the solution had a pH of 11.01. This solution was then heated to 55° C. and neutralized with 5M acetic acid. Upon cooling a gel formed having a gel strength of 91 g/cm².

Example 17

Coprocessing:

Locust Bean Gum/Curdlan

A 1:1 clarified locust bean gum (CLBG) and curdlan solution was prepared using 2% solutions (200 ml) of CLBG and substantially pure curdlan to give a final gum content of 1% each in a final volume of 400 ml. A 2% CLBG solution was prepared by dissolving 4 g CLBG (lot #B2154) in 200 ml distilled water, heating to boiling. A 2% curdlan solution was also prepared by suspending 4 g substantially pure curdlan in 180 ml distilled water and adding 20 ml 1.0N NaOH, heating to dissolve the curdlan. The above two solutions were mixed and allowed to cool to 55° C. From this mixture, 200 ml was removed and then neutralized with 5M acetic acid. Upon cooling a gel formed having a gel strength of 49 g/cm². When this gel was heat set in a boiling waterbath for 20 minutes, the gel did not melt before heat setting. A 100 ml portion of the remaining 200 ml CLBG and curdlan mixture was heated to 55° C. and coagulated directly in 200 ml 99% isopropyl alcohol. The coagulum was recovered on a polyester cloth by vacuum filtration, washed in 200 ml 80% isopropyl alcohol, and hardened in 200 ml 99% isopropyl alcohol, again recovering the coagulum between washes by vacuum filtration. The recovered coagulum was squeezed to remove excess alcohol, and dried overnight at 55° C. The recovered dried product (1.463 g) was ground through a 40 mesh (420 micron) screen. A 1 g sample of this coprocessed product was dissolved by heating to boiling in 100 ml distilled water. The pH of this solution was 10.7. A gel was formed after neutralizing with 5M acetic acid at 55° C. and then cooling. The gel strength of this gel was a very weak 9 g/cm². When this gel was heat set as above, the gel did not melt before heat setting and the gel strength was 13 g/cm². The remaining 100 ml of the CLBG—curdlan mixture was neutralized at 55° C. before coagulating in 99% isopropyl alcohol. The coagulum was washed and dried at 55° C. as above. The recovered coprocessed material weighed 1.836 g. A 1% solution of this coprocessed material would not dissolve in distilled water or 0.1N NaOH, even with heating.

Alginate/Curdlan

A 1:1 sodium alginate and curdlan solution was prepared using 2% solutions (200 ml) of sodium alginate and curdlan to give a final gum content of 1% and total volume of 400 ml. A 2% alginate solution was prepared by dissolving 4 g sodium alginate (lot #140430) in 200 ml distilled water, then heating to boiling. A 2% curdlan solution was also prepared by suspending 4 g substantially pure curdlan in 180 ml distilled water and adding 20 ml 1.0N NaOH, then heating to dissolve the curdlan. These two solutions were mixed with rapid stirring. A portion of this mixture (200 ml) was removed and allowed to cool to 55° C. and then neutralized with 5M acetic acid. Upon cooling at room temperature, a gel formed. After chilling in the refrigerator for 2 hours, the gel strength was measured and found to be 55 g/cm². This gel was heat set in a boiling water bath for 20 minutes which resulted in the gel melting and reforming. When cooled, a gel strength of 134 g/cm² was observed. The remaining 200 ml portion of alginate and curdlan mixture was cooled to 55° C. and coagulated in 400 ml 99% isopropyl alcohol (2×volume). The coagulum was recovered by centrifugation at 7500 rpm for 10 minutes. The supernatant was removed and the pellets washed in 2×volume 80% isopropyl alcohol (400 ml) for 45 minutes. The coagulum was recovered on a polyester cloth by vacuum filtration. Excess alcohol was removed by squeezing. The coagulum was hardened in 2×volume 99% isopropyl alcohol and recovered as above, squeezed to remove excess alcohol, and dried overnight at 55° C. The recovered dried product (3.55 g) was ground through a 40 mesh (420 micron) screen. One-quarter gram of this alginate and curdlan coprocessed material was suspended in 22.5 ml distilled water and found to be insoluble in water even after heating. After adding 2.5 ml of 1.0N NaOH to the suspension, there was still no dissolution with heating and continuous stirring.

There are several advantages to coprocessed compositions. Coprocessing varies (a) the viscosity (of sols); (b) the strength (of gels); and the rheology (of both sols and gels). These variations permit a coprocessed sol or gel to be adapted to particular user requirements that cannot be met by employing a β-1,3-glucan polysaccharide by itself.

We claim:

1. A polysaccharide composition comprising a compound selected from the group consisting of a β-1,3-glucan polysaccharide, a partially depolymerized β-1,3-glucan polysaccharide, a hydroxyalkyl derivative of a β-1,3-glucan polysaccharide, or a partially depolymerized hydroxyalkyl derivative of a β-1,3-glucan polysaccharide, and alkali metal salts thereof, wherein the partial depolymerization is equivalent to the exposure of 200 Krad to 800 Krad of gamma radiation from Cobalt 60, which will form a clear, aqueous 1% by weight sol, has essentially a baseline UV absorption at 260 nm, and a gel of the sol has essentially no background fluorescence when stained with ethidium bromide.

2. The polysaccharide composition of claim 1 wherein the hydroxyalkyl derivative is hydroxyethyl.

3. The polysaccharide composition of claim 1 incorporated into sufficient water to form an 0.5% to 10% aqueous gel.

4. The polysaccharide composition of claim 2 incorporated into sufficient water to form an 0.5% to 10% aqueous gel.

5. The polysaccharide composition of claim 1 further comprising at least one chaotropic agent.

6. The polysaccharide composition of claim 1 wherein the hydroxyalkyl derivative is hydroxyglyceryl.

7. The polysaccharide composition of claim 5 wherein said chaotropic agent is at least one of urea, lithium bromide, lithium iodide, or guanidium isothiocyanate.

8. The polysaccharide composition of claim 6 further comprising a chaotropic agent which is at least one of urea, lithium bromide, lithium iodide, or guanidinium isothiocyanate.

9. An aqueous gel which is the product of the process of a) mixing a 20 to 80 weight percent aqueous solution of a chaotropic salt with a 0.5 to 10 weight percent aqueous sol of at least one β-1,3-glucan polysaccharide which polysaccaride will form a clear, aqueous 1% by weight sol having essentially a baseline UV adsorption at 260 nm; b) heating the mixture until a a homogeneous sol is formed; c) cooling the heated mixture to form a gel which has essentially no background fluorescence when stained with ethidium bromide; and d) washing the gel with water thereby removing the chaotropic agent.

10. An aqueous gel which is the product of the process of the process of a) mixing a 20 to 80 weight percent aqueous solution of a chaotropic salt with a 0.5 to 10 weight percent aqueous sol of at least one substantially pure hydroxyalkylated derivative of a β-1,3-glucan polysaccharide having a degree of substitution of 0.01 to 10 or a coprocessed mixture with at least one other hydrocolloid; b) heating the mixture until a homogeneous sol is formed; c) cooling the heated mixture to form a gel.

11. An aqueous gel which is the product of the process of a) mixing a 20 to 80 weight percent aqueous solution of a chaotropic salt with a 0.5 to 10 weight percent aqueous sol of curdlan which curdlan will form a clear, aqueous 1% by weight sol having essentially a baseline UV adsorption at 260 nm; b) heating the mixture until a homogeneous sol is formed; and c) cooling the heated mixture to form a gel which has essentially no background fluorescence when stained with ethidium bromide.

12. An aqueous gel which is the product of the process of a) mixing a 20 to 80 weight percent aqueous solution of a chaotropic agent selected from the group consisting of urea, lithium bromide, lithium iodide or guanidinium isothiocyanate with a 0.5 to 10 weight percent aqueous sol of at least one β-1,3-glucan polysaccharide which polysaccaride will form a clear, aqueous 1% by weight sol having essentially a baseline UV adsorption at 260 nm; b) heating the mixture until a homogeneous sol is formed; and c) cooling the heated mixture to form a gel which has essentially no background fluorescence when stained with ethidium bromide.

13. A water-soluble alkali metal salt of a substantially pure β-1,3-glucan polysaccharide providing gel-forming sols which are clear gels which exhibit essentially no background fluorescence when stained with ethidium bromide and which exhibit essentially baseline UV absorption at 260 nm.

14. The salt of claim 13 wherein the β-1,3-glucan polysaccharide is curdlan.

15. The salt of claim 13 wherein the alkali metal salt is the sodium salt.

16. A hydroxylated β-1,3-glucan polysaccharide, wherein its degree of substitution is about 0.01 to about 1 and its hydroxyalkyl moiety is a $C_2$–$C_4$ monohydroxyalkyl or $C_3$–$C_4$ dihydroxyalkyl providing gel-forming sols which are clear gels which exhibit essentially no background fluorescence when stained with ethidium bromide and which exhibit essentially baseline UV absorption at 260 nm.

17. The hydroxyalkylated polysaccharide of claim 16 wherein the β-1,3-glucan polysaccharide is curdlan.

18. The hydroxyalkylated polysaccharide of claim 17 wherein it is hydroxyethyl curdlan.

19. The hydroxyalkylated polysaccharide of claim 17 wherein it is glyceryl curdlan.

20. The substantially pure hydroxylated β-1,3-glucan polysaccharide of claim 17 wherein it is in the form of an aqueous gel containing about 0.5 to 10 weight percent of said polysaccharide.

21. The hydroxyalkylated curdlan of claim 17 wherein it is in the form of an aqueous gel.

22. A partially depolymerized substantially pure β-1,3-glucan polysaccharide providing gel-forming sols which are clear gels which exhibit essentially no background fluorescence when stained with ethidium bromide and which exhibit essentially baseline UV absorption at 260 nm.

23. The partially depolymerized β-1,3-glucan polysaccharide of claim 22 wherein the β-1,3-glucan polysaccharide is curdlan.

24. A partially depolymerized hydroxyalkylated β-1,3-glucan polysaccharide providing gel-forming sols which are clear gels which exhibit essentially no background fluorescence when stained with ethidium bromide and which exhibit essentially baseline UV absorption at 260 nm, the partial depolymerization being equivalent to the exposure caused by 200 Krad to 800 Krad of gamma radiation from Cobalt 60.

25. The partially depolymerized hydroxyalkylated β-1,3-glucan polysaccharide of claim 24 wherein the β-1,3-glucan polysaccharide is curdlan.

26. The hydroxylated curdlan of claim 25 wherein the hydroxylated moiety is glyceryl.

27. A coprocessed hydrocolloid composition comprising: a) from about 10 to 90 parts by weight of a compound selected from the group consisting of a substantially pure β-3-1, 3-glucan polysaccharide, a substantially pure hydroxyalkylated β-1,3-glucan polysaccharide, a partially depolymerized substantially pure β-1,3-glucan polysaccharide, or a hydroxyalkylated derivative thereof, and b) the remainder to 100 parts by weight of at lease one hydrocolloid other than any of the above, wherein the partial depolymerization is equivalent to the exposure of 200 Krad to 800 Krad of gamma radiation from Cobalt 60 and wherein the substantially pure glucan polysaccharides will form clear, aqueous 1% by weight sols having essentially a baseline UV absorption at 260 nm, and gels from the sols have essentially no background fluorescence when stained with ethidium bromide.

28. The composition of claim 27 wherein from about 50 to 90 parts by weight of component a) are present.

29. The composition of claim 27 wherein component b) is agarose, a hydroxyalkylated agarose derivative, clarified locust bean gum, sodium alginate, or starch.

30. The composition of claim 29 wherein component a) is substantially pure curdlan.

31. An aqueous gel wherein it contains from about 0.5 to 10 weight percent of the composition of claim 27.

32. The aqueous gel of claim 31 herein component b) is clarified locust bean gum.

33. An aqueous gel prepared by the process of a) mixing a 20 to 80 weight percent aqueous solution of a chaotropic salt with a 0.5 to 10 weight percent aqueous sol of at least one β-1,3-glucan polysaccharide which polysaccaride will form a clear, aqueous 1% by weight sol, has essentially a baseline UV adsorption at 260 nm; b) heating the mixture until a homogeneous sol is formed; and c) cooling the heated mixture to form a gel which has essentially no background fluorescence when stained with ethidium bromide.

34. A clear, substantially pure curdlan comprising a 1% by weight aqueous sol having essentially no background fluorescence when stained with ethidium bromide; and essentially baseline UV absorption at 260 nm.

* * * * *